(12) United States Patent
Novick et al.

(10) Patent No.: US 9,076,158 B2
(45) Date of Patent: Jul. 7, 2015

(54) INTEGRATED SYSTEM AND METHOD FOR MANAGING ELECTRONIC COUPONS

(75) Inventors: Walter R. Novick, Mission Hills, KS (US); Scott B. Relf, Naples, FL (US); Brian K. Brinkley, Canyon Lake, TX (US)

(73) Assignee: GOOGLE INC., Mountain View, CA (US)

(*) Notice: Subject to any disclaimer, the term of this patent is extended or adjusted under 35 U.S.C. 154(b) by 2115 days.

(21) Appl. No.: 11/855,143

(22) Filed: Sep. 13, 2007

(65) Prior Publication Data

US 2008/0065490 A1 Mar. 13, 2008

Related U.S. Application Data

(60) Provisional application No. 60/825,549, filed on Sep. 13, 2006, provisional application No. 60/911,749, filed on Apr. 13, 2007.

(51) Int. Cl.
*G06Q 30/00* (2012.01)
*G06Q 30/02* (2012.01)

(52) U.S. Cl.
CPC ............ *G06Q 30/0225* (2013.01); *G06Q 30/02* (2013.01); *G06Q 30/0236* (2013.01); *G06Q 30/0239* (2013.01)

(58) Field of Classification Search
USPC ......................................................... 705/14
See application file for complete search history.

(56) References Cited

U.S. PATENT DOCUMENTS

| | | | |
|---|---|---|---|
| 5,855,007 A | 12/1998 | Jovicic et al. | |
| 2002/0070976 A1* | 6/2002 | Tanner et al. | 345/810 |
| 2002/0077907 A1* | 6/2002 | Ukai et al. | 705/14 |
| 2002/0091569 A1* | 7/2002 | Kitaura et al. | 705/14 |

(Continued)

FOREIGN PATENT DOCUMENTS

| | | |
|---|---|---|
| EP | 1 164 529 A1 | 12/2001 |
| WO | WO 2005/103968 A1 | 11/2005 |

OTHER PUBLICATIONS

International Search Report for PCT/US07/20003 dated Mar. 13, 2008.

(Continued)

*Primary Examiner* — Matthew T Sittner
(74) *Attorney, Agent, or Firm* — Johnson, Marcou & Isaacs, LLC

(57) ABSTRACT

A networked electronic coupon management system is disclosed for managing electronic coupons. The system includes tightly integrated database, application server, and client components facilitating performing electronic coupon definition, issuance, and redemption operations. The operations include creating electronic coupons, wherein each electronic coupon includes a unique coupon ID, creating customer accounts, wherein each customer account comprises a unique customer ID; creating manufacturer accounts, wherein each manufacturer account comprises a Unique ID; and creating retailer accounts, wherein each retailer account comprises a unique retailer ID; and assigning a unique electronic coupon ID to a unique customer ID. Thereafter the system validates the electronic coupon with a product purchase transaction by a customer associated with the unique customer ID. Furthermore, funds transfers associated with the product purchase transaction are tracked, and historical transactional level data is maintained for all customer, manufacturer and retailer accounts.

24 Claims, 27 Drawing Sheets

(56) References Cited

U.S. PATENT DOCUMENTS

| | | | |
|---|---|---|---|
| 2002/0091571 A1* | 7/2002 | Thomas et al. | 705/14 |
| 2002/0111864 A1* | 8/2002 | Ukai et al. | 705/14 |
| 2002/0128911 A1* | 9/2002 | Furuta | 705/14 |
| 2002/0138348 A1* | 9/2002 | Narayan et al. | 705/14 |
| 2003/0233276 A1* | 12/2003 | Pearlman et al. | 705/14 |
| 2004/0140361 A1* | 7/2004 | Paul et al. | 235/462.45 |
| 2004/0249712 A1* | 12/2004 | Brown et al. | 705/14 |
| 2005/0071230 A1* | 3/2005 | Mankoff | 705/14 |
| 2005/0222910 A1* | 10/2005 | Wills | 705/22 |
| 2005/0234771 A1* | 10/2005 | Register et al. | 705/14 |

OTHER PUBLICATIONS

Written Opinion for PCT/US07/20003 dated Mar. 13, 2008.
Supplementary European Search Report dated Aug. 8, 2011, for EP 07 83 8239.

* cited by examiner

300 — Companies Table Record
| | |
|---|---|
| companies_id | :integer |
| came | :string |
| coupon_code | :integer |
| type | :string |
| created_at | :datetime |
| updated_at | :datetime |
| accounting_address_id | :integer |
| department_id | :integer |
| region_id | :integer |
| hq_address_id | :integer |
| billing_cycle | :integer |

FIG. 4a

310 — Categories Table Record
| | |
|---|---|
| categories_id | :integer |
| name | :string |
| parent_id | :integer |
| position | :integer |

FIG. 4b

320 — Users Table Record
| | |
|---|---|
| users_id | :integer |
| login | :string |
| email | :string |
| crypted_password | :string |
| salt | :string |
| created_at | :datetime |
| updated_at | :datetime |
| remember_token | :string |
| remember_token_expires_at | :datetime |
| first_name | :string |
| last_name | :string |
| company_id | :integer |
| department_id | :integer |
| store_id | :integer |
| region_id | :integer |

FIG. 4c

330 — *Roles_users Table Record*
| | |
|---|---|
| user_id | :integer |
| role_id | :integer |
| created_at | :datetime |
| updated_at | :datetime |

FIG. 4d

340 — *Roles Table Record*
| | |
|---|---|
| roles_id | :integer |
| name | :string |
| authorizable_type | :string |
| authorizable_id | :integer |
| created_at | :datetime |
| updated_at | :datetime |
| display_name | :string |

FIG. 4e

350 — *Departments Table Record*
| | |
|---|---|
| departments_id | :integer |
| name | :string |
| parent_id | :integer |
| description | :string |
| budget | :decimal |

FIG. 4f

360 — *Regions Table Record*
| | |
|---|---|
| regions_id | :integer |
| name | :string |
| parent_id | :integer |
| description | :string |

FIG. 4g

| | *Stores Table Record* | |
|---|---|---|
| 370 | stores_id | :integer |
| | name | :string |
| | region_id | :integer |
| | retailer_id | :integer |
| | disabled_at | :datetime |
| | disabled_by | :integer |
| | ref_id | :string |

FIG. 4h

| | *Point of Sales Table Record* | |
|---|---|---|
| 380 | point_of_sales_id | :integer |
| | name | :string |
| | store_id | :integer |
| | disabled_at | :datetime |
| | disabled_by | :integer |
| | ref_id | :string |

FIG. 4i

| | *Product Groups Table Record* | |
|---|---|---|
| 390 | product_group_id | :integer |
| | name | :string |
| | company_id | :integer |
| | description | :string |
| | default_image_id | :integer |
| | ref_id | :string |

FIG. 4j

| | *Product-UPC Mappings Table Record* | |
|---|---|---|
| 400 | product_group_id | :integer |
| | upc_id | :integer |

FIG. 4k

410 — *UPCs Table Record*
| | |
|---|---|
| upc_id | :integer |
| name | :string |
| check_digit | :integer |
| company_id | :integer |
| code | :string |

FIG. 4l

420 — *Image-Product Mappings Table Record*
| | |
|---|---|
| product_group_id | :integer |
| product_image_id | :integer |

FIG. 4m

430 — *Product Images Table Record*
| | |
|---|---|
| product_image_id | :integer |
| parent_id | :integer |
| company_id | :integer |
| name | :string |
| filename | :string |
| content_type | :string |
| size | :string |
| width | :string |
| height | :string |

FIG. 4n

440 — *Campaign Areas Table Record*
| | |
|---|---|
| campaign_area_id | :integer |
| name | :string |
| description | :string |
| company_id | :integer |

FIG. 4o

450 — *Campaign-Area Mappings Table Record*
| campaign_area_id | :integer |
| postal_code_id | :integer |

FIG. 4p

460 — *Postal Codes Table Record*
| postal_codes_id | :integer |
| name | :string |
| zip_code | :string |

FIG. 4q

470 — *Ad Campaign Table Record*
| ad_campaign_id | :integer |
| company_id | :integer |
| name | :string |
| campaign_start_date | :datetime |
| campaign_end_date | :datetime |
| created_at | :datetime |
| updated_at | :datetime |
| category_id | :integer |
| display_text | :text |
| web_activation_date | :datetime |
| web_inactivation_date | :datetime |
| coupon_value_id | :integer |
| campaign_area_id | :integer |
| product_group_id | :integer |
| forced_web_inactive | :datetime |
| forced_web_inactive_by | :integer |
| assumed_redemption_value | :decimal |
| approver_id | :integer |
| approved_at | :datetime |
| department_id | :integer |
| budget | :decimal |
| product_image_id | :integer |
| creator_id | :integer |

FIG. 4r

| Coupons Table Record | |
|---|---|
| coupons_id | :integer |
| consumer_id | :integer |
| retailer_id | :integer |
| serialnumber | :string |
| redeemed_date | :datetime |
| purchasedproduct | :string |
| created_at | :datetime |
| updated_at | :datetime |
| ad_campaign_id | :integer |
| invoice_id | :integer |
| state | :integer |
| point_of_sale_id | :integer |
| redemption_value | :decimal |

| Coupon Values Table Record | |
|---|---|
| face_value | :string |
| code | :string |

| Consumers Table Record | |
|---|---|
| consumers_id | :integer |
| first_name | :string |
| last_name | :string |
| address | :string |
| address2 | :string |
| "city" | :string |
| "state" | :string |
| "zip_code" | :string |
| "country" | :string |
| "gender" | :string |
| "birthday" | :string |
| "email" | :string |
| "created_at" | :datetime |
| "updated_at" | :datetime |
| "login" | :string |
| "password" | :string |

510 — 
| Invoices Table Record | |
|---|---|
| invoices_id | :integer |
| amount | :decimal |
| invoiced_date | :date |
| invoiced_by | :integer |
| paid_date | :date |
| paid_by | :integer |
| posted_date | :date |
| posted_by | :integer |
| state | :integer |
| payment_method | :string |
| payment_confirmation | :string |
| payer_id | :integer |
| payee_id | :integer |
| coupon_count | :integer |
| peer_invoice_id | :integer |
| due_on | :date |

FIG. 4v

| | |
|---|---|
| Manage Authorized Users | 500 |
| Manage Departments | 502 |
| Manage Product Groups | 504 |
| Manage Product Images | 506 |
| Manage Ad Campaign Distribution Areas | 508 |
| Create Ad Campaigns | 510 |
| Manage Campaign Budget Settings | 512 |
| Support Cross Product Promotions | 514 |
| Support Complex Loyalty Promotions | 516 |
| View Campaign Summary Information | 518 |
| View Campaign Summary Statistics | 520 |
| View Statistical Forecasting | 522 |
| View Campaign Statistics | 524 |
| Edit, Approve, or Deactivate Ad Campaigns | 526 |
| View Invoice Summary Information by Campaign | 528 |
| View Invoice Summary Information by Retailer | 530 |
| View Invoices By Retailer | 532 |
| Pay Invoice From Retailer | 534 |
| Pay Invoice From Coupons Service Provider | 536 |
| View Invoice Detail | 538 |
| Print Report Pages | 540 |
| Manage Campaign Fees | 542 |

FIG. 5a

| | |
|---|---|
| View Default Consumer Screen (Home Page) | 550 |
| Provide Consumer Login Prompt | 552 |
| Create and Edit Consumer Accounts | 554 |
| View Available Coupons | 556 |
| View In-Store Coupons | 558 |
| Add a Coupon to he Consumer's Account | 560 |
| View Consumer's Coupons | 562 |
| Print a List of Coupons | 564 |
| Search Campaigns Using Shopping List | 566 |
| Provide Basic Coupon Search | 568 |
| Provide Expanded Coupon Search | 570 |
| Provide Search on Product Preferences | 572 |
| Allow Banner Ad Access | 574 |
| Allow Wireless Ad Access | 576 |
| Allow Internet-Connected TV Access | 578 |

FIG. 5b

| | |
|---|---|
| Manage Manufacturer Accounts | 610 |
| Manage Retailer Accounts | 612 |
| View Manufacturer's Data | 614 |
| View Retailer's Data | 616 |
| View Consumer Data | 618 |
| Manage Coupon Value Codes | 620 |
| Manage Product Categories | 622 |
| Manage Coupon Invoice | 624 |
| Manage Batch Jobs | 626 |
| Email Notifications | 628 |
| Manage Coupon Expiration | 630 |
| Invoice Coupons | 632 |
| Rate Invoice for Retailer | 634 |
| Rate Invoice for Electronic Coupon Service | 636 |
| Web Inactivate Ad Campaigns | 638 |
| Manage POS Interfaces | 640 |
| Manage System Resources | 642 |

FIG. 5e

Coupon Summary for All Regions

All Regions Summary

|  | Total | Redeemed | Invoiced | Paid | Posted |
|---|---|---|---|---|---|
| Number of Coupons | 797 | 428 | 130 | 95 | 144 |
| Value of Coupons | $1,616.30 | $741.30 | $327.10 | $278.65 | $269.25 |

Coupon Summary by Stores

| Store | Coupons Redeemed | Value Redeemed | Coupons Invoiced | Value Invoiced | Coupons Paid | Value Paid | Coupons Posted | Value Posted |
|---|---|---|---|---|---|---|---|---|
| Overland Park | 71 | $132.90 | 20 | $32.10 | 22 | $54.90 | 21 | $51.15 |
| Lenexa | 72 | $134.55 | 27 | $51.35 | 15 | $30.40 | 28 | $59.45 |
| Olathe | 70 | $111.75 | 22 | $60.55 | 12 | $50.65 | 26 | $48.40 |
| Raytown | 75 | $114.85 | 18 | $50.55 | 13 | $33.95 | 20 | $39.45 |
| Kansas City | 69 | $121.85 | 24 | $62.50 | 13 | $51.45 | 18 | $18.75 |
| Austin | 70 | $125.40 | 19 | $70.05 | 20 | $57.30 | 31 | $52.05 |

FIG. 8

Campaign Statistics

| | |
|---|---|
| Web Activation Date | 08/14/2007 |
| Web Inactivation Date | 09/25/2007 |
| Coupon Start Date | 08/14/2007 |
| Coupon Expiration Date | 10/09/2007 |
| Created By | Test Man 1 Creator |
| Creation Date | 07/24/2007 |
| Approved By | Test Man 1 Campaignmanager |
| Approval Date | 07/31/2007 |
| Deactivated By | |
| Deactivation Date | |
| Redemption Mean Time | 0 days |
| Redemption Median Time | 0 days |
| Redemption Mode Time | 0 days |

Campaign Budget Information

| coupons | number | value | % of budget |
|---|---|---|---|
| Budgeted | 2403 | $2,500.00 | |
| Issued | 987 | $542.85 | 21.71% |
| Outstanding | 194 | $106.70 | 4.27% |
| Redeemed | 793 | $436.15 | 17.45% |
| Removed | 0 | $0.00 | 0.00% |

Campaign Invoice Information

| | | | |
|---|---|---|---|
| Uninvoiced | 793 | $436.15 | 17.45% |
| Invoiced | 0 | $0.00 | 0.00% |
| Paid | 0 | $0.00 | 0.00% |
| Posted | 0 | $0.00 | 0.00% |

FIG. 14

Redemption Statistics By Retailer

| retailer | redeemed | % of total issued | % of total redeemed | invoiced | paid | posted |
|---|---|---|---|---|---|---|
| Test Retailer 1 | 200 ($110.00) | 0.0440% | 0.0440% | 0 | 0 | 0 |
| Test Retailer 2 | 201 ($110.55) | 0.0442% | 0.0442% | 0 | 0 | 0 |
| Test Retailer 3 | 195 ($107.25) | 0.0429% | 0.0429% | 0 | 0 | 0 |
| Test Retailer 4 | 197 ($108.35) | 0.0433% | 0.0433% | 0 | 0 | 0 | home   FAQ   privacy policy   contact us   © 2007

| | | | | | | | | | | |
|---|---|---|---|---|---|---|---|---|---|---|

Create Ad Campaign
Department: All Departments
Budget: $74,000.00

All Ad Campaign Summary

| | budgeted | issued | used | outstanding | expired |
|---|---|---|---|---|---|
| Number of Coupons: | 36615 | 6975 | 5567 | 705 | 703 |
| Value of Coupons: | $47,000.00 | $5,678.24 | $5,309.56 | $600.08 | $768.60 |
| Percent of Department Budget: | 63.51% | 9.02% | 7.18% | 0.81% | 1.04% |

All Ad Campaigns

| id | department | campaign | web dates | campaign dates | face value | campaign budget | issued number/value | used number/value | actions |
|---|---|---|---|---|---|---|---|---|---|
| 157 | Subdepartment 1 | Aug 2007 Wish-Bone Creamy Caesar Dressing | 08/21/2007 10/09/2007 | 08/21/2007 10/30/2007 | $1.60 | 2392 $5,000.00 | 0 $0.00 | 0 $0.00 | Deactivate Delete |
| 158 | Subdepartment 1 | Sep 2007 Vaseline | 09/04/2007 10/30/2007 | 09/04/2007 11/20/2007 | $1.00 | 1677 $2,500.00 | 0 $0.00 | 0 $0.00 | Deactivate Delete |
| 159 | Subdepartment 1 | Sep 2007 Ultra Purex | 09/25/2007 11/06/2007 | 09/25/2007 11/20/2007 | $0.15 | 6250 $4,000.00 | 0 $0.00 | 0 $0.00 | Deactivate Delete |
| 160 | Subdepartment 1 | Aug 2007 Slim-Fast Optima Shakes | 08/28/2007 10/23/2007 | 08/28/2007 11/13/2007 | $1.35 | 1630 $3,000.00 | 0 $0.00 | 0 $0.00 | Edit Approve Delete |
| 161 | Subdepartment 1 | Aug 2007 Wish-Bone Creamy Caesar Dressing | 08/14/2007 09/25/2007 | 08/14/2007 10/09/2007 | $0.55 | 2403 $2,500.00 | 987 $542.85 | 793 $436.15 | Statistics Deactivate |
| 162 | Subdepartment 1 | Jul 2007 Vaseline | 07/10/2007 09/25/2007 | 07/10/2007 10/09/2007 | $0.69 | 2966 $3,500.00 | 141 $97.29 | 114 $78.66 | Statistics Deactivate |
| 163 | Subdepartment 1 | Jun 2007 Ultra Purex | 06/19/2007 09/11/2007 | 06/19/2007 10/02/2007 | $3.50 | 877 $3,500.00 | 141 $493.50 | 106 $371.00 | Statistics Deactivate |
| 164 | Subdepartment 1 | Jun 2007 Slim-Fast Optima Shakes | 06/19/2007 09/11/2007 | 06/19/2007 10/02/2007 | $0.55 | 4807 $5,000.00 | 1113 $612.15 | 898 $493.90 | Statistics Deactivate |
| 165 | Subdepartment 1 | May 2007 Campbell's Soup | 05/22/2007 07/10/2007 | 05/22/2007 07/24/2007 | $1.00 | 2348 $3,500.00 | 1113 $1,113.00 | 888 $888.00 | Statistics |
| 166 | Subdepartment 1 | May 2007 Edge Shaving Gel | 05/29/2007 08/07/2007 | 05/29/2007 08/28/2007 | $1.00 | 2348 $3,500.00 | 1113 $1,113.00 | 879 $879.00 | Statistics |

Redemption Statistics By Zip Code

| zip code | issued | redeemed | outstanding | % redeemed | mean time | median time | mode time |
|---|---|---|---|---|---|---|---|
| 64101 | 58 ($31.90) | 48 ($26.40) | 10 ($5.50) | 1.06% | 0 days | 0 days | 0 days |
| 64108 | 1 ($0.55) | 0 ($0.00) | 1 ($0.55) | 0.00% | 0 days | 0 days | 0 days |
| 66201 | 132 ($72.60) | 109 ($59.95) | 23 ($12.65) | 2.40% | 0 days | 0 days | 0 days |
| 66047 | 1 ($0.55) | 1 ($0.55) | 0 ($0.00) | 0.02% | 0 days | 0 days | 0 days |
| 64086 | 137 ($75.35) | 109 ($59.95) | 28 ($15.40) | 2.40% | 0 days | 0 days | 0 days |
| 66044 | 1 ($0.55) | 1 ($0.55) | 0 ($0.00) | 0.02% | -1 days | -1 days | -1 days |
| 66051 | 1 ($0.55) | 0 ($0.00) | 1 ($0.55) | 0.00% | 0 days | 0 days | 0 days |
| 66056 | 1 ($0.55) | 1 ($0.55) | 0 ($0.00) | 0.02% | 0 days | 0 days | 0 days |
| 66061 | 1 ($0.55) | 1 ($0.55) | 0 ($0.00) | 0.02% | -1 days | -1 days | -1 days |
| 66101 | 127 ($69.85) | 108 ($59.40) | 19 ($10.45) | 2.38% | 0 days | 0 days | 0 days |
| 66205 | 1 ($0.55) | 1 ($0.55) | 0 ($0.00) | 0.02% | 0 days | 0 days | 0 days |
| 66210 | 4 ($2.20) | 4 ($2.20) | 0 ($0.00) | 0.09% | 1 day | 1 day | 1 day |
| 66222 | 1 ($0.55) | 1 ($0.55) | 0 ($0.00) | 0.02% | 0 days | 0 days | 0 days |
| 66251 | 1 ($0.55) | 1 ($0.55) | 0 ($0.00) | 0.02% | 0 days | 0 days | 0 days |
| 66286 | 1 ($0.55) | 1 ($0.55) | 0 ($0.00) | 0.02% | 0 days | 0 days | 0 days |
| 64133 | 1 ($0.55) | 1 ($0.55) | 0 ($0.00) | 0.02% | 0 days | 0 days | 0 days |
| 64022 | 1 ($0.55) | 1 ($0.55) | 0 ($0.00) | 0.02% | 0 days | 0 days | 0 days |
| 66020 | 1 ($0.55) | 1 ($0.55) | 0 ($0.00) | 0.02% | 0 days | 0 days | 0 days |
| 64150 | 1 ($0.55) | 1 ($0.55) | 0 ($0.00) | 0.02% | 1 day | 1 day | 1 day |
| 64152 | 119 ($65.45) | 91 ($50.05) | 28 ($15.40) | 2.00% | 0 days | 0 days | 0 days |
| 66036 | 133 ($73.15) | 109 ($59.95) | 24 ($13.20) | 2.40% | 0 days | 0 days | 0 days |
| 64016 | 128 ($70.40) | 99 ($54.45) | 29 ($15.95) | 2.18% | 0 days | 0 days | 0 days |
| 64141 | 133 ($73.15) | 104 ($57.20) | 29 ($15.95) | 2.29% | 0 days | 0 days | 0 days |
| 66208 | 1 ($0.55) | 0 ($0.00) | 1 ($0.55) | 0.00% | 0 days | 0 days | 0 days |
| 64052 | 1 ($0.55) | 0 ($0.00) | 1 ($0.55) | 0.00% | 0 days | 0 days | 0 days |

Redemption Statistics By Retailer

| retailer | redeemed | % of total issued | invalided | % of total redeemed | paid | posted |
|---|---|---|---|---|---|---|

FIG. 21
INTEGRATED SYSTEM AND METHOD FOR MANAGING ELECTRONIC COUPONS

CROSS-REFERENCE TO RELATED APPLICATION

This application claims priority of Novick et al. U.S. Provisional Application Ser. No. 60/825,549 filed on Sep. 13, 2006, entitled "Dynamic Lifetime Management of Electronic Coupons," and Brinkley et al. U.S. Provisional Application Ser. No. 60/911,749 filed on Apr. 13, 2007, entitled "Point of Sale Interfaces for Electronic Coupon Systems," the contents of both applications are expressly incorporated herein by reference in their entirety including the contents and teachings of any references contained therein.

AREA OF THE INVENTION

The present invention generally relates to the area of networked marketing systems capable of providing access to databases comprising a variety of information relating to electronic coupons that are redeemed, for example, during electronically registered customer purchases at retail outlets.

BACKGROUND

Marketers in the top 14 consumer categories spend $300 Billion annually to reach consumers through promotion ($228 BN) and advertising ($97 BN). The inefficiency of the paper-based process results in a higher-than-necessary cost per redemption for marketers and causes many coupon users, frustrated by the time and effort required, to simply give up. Today, shoppers must sort through the hundreds of paper coupons they receive in newspapers, magazines and the mail, cut out the coupons that are of interest, store them, remember to take them to the grocery store, and finally redeem them by handing the paper coupons to a cashier at checkout. The billions of paper coupons ultimately redeemed are handled by up to 8 pairs of hands before they are finally routed back through a clearinghouse to the manufacturer. 76% of the United States population uses coupons from Sunday newspaper inserts, retailers' fliers, magazines, in/on packages and online coupons, each year. (84% of females and 68% of males use coupons). In 2005, 323 billion paper coupons were distributed however less than 1% was redeemed. Despite the problems associated with paper coupons marketers continue use them because coupons are an effective promotional tool with very predictable costs and results and no proven paperless replacement.

SUMMARY OF THE INVENTION

The present invention comprises a networked system (and related methods) for managing electronic coupons. The system includes tightly integrated database, application server, and client components facilitating performing electronic coupon definition, issuance, and redemption operations. The operations include creating electronic coupons, wherein each electronic coupon includes a unique coupon ID, creating customer accounts, wherein each customer account comprises a unique customer ID; creating manufacturer accounts, wherein each manufacturer account comprises a Unique ID; and creating retailer accounts, wherein each retailer account comprises a unique retailer ID; and assigning a unique electronic coupon ID to a unique customer ID. Thereafter the system validates the electronic coupon with a product purchase transaction by a customer associated with the unique customer ID. Furthermore, funds transfers associated with the product purchase transaction are tracked, and historical transactional level data is maintained for all customer, manufacturer and retailer accounts.

BRIEF DESCRIPTION OF THE DRAWINGS

While the claims set forth the features of the present invention with particularity, the invention, together with its objects and advantages, may be best understood from the following detailed description taken in conjunction with the accompanying drawing of which:

FIGS. 4*a*-4*v* summarize fields of an exemplary set of tables centrally maintained by database servers to support a set of events associated with lifetime management of electronic coupons;

FIGS. 5*a-e* identify a sets of events that drive the operation of the disclosed electronic coupon system;

FIG. 8 depicts an exemplary user interface for presenting coupon summary information on a store-by-store basis;

FIG. 14 is an exemplary user interface for presenting statistical and budget information for an Ad Campaign;

FIG. 15 is an exemplary user interface for presenting aggregate coupon redemption statistics on a store-by-store basis;

FIG. 19 is an exemplary user interface for monitoring ad campaigns on a departmental basis;

FIG. 21 is an exemplary user interface for displaying Ad Campaign results by ZIP code.

DETAILED DESCRIPTION OF THE DRAWINGS

The exemplary electronic coupon management system comprises an integrated set of tables/databases and coupon processing modules for carrying out a subscriber-based electronic coupon issuance and redemption services providing a high degree of both control and traceability of electronic marketing, coupon transactions including: requesting, creating, distributing, managing, reporting on, redeeming, settling, archiving, and the payment and accounting. The electronic coupon system is highly scalable to potentially handle very high throughput and maintain a traceable and auditable history for all of the above-identified transactions in a network comprising both wide area (e.g., the Internet) and local area networks (local in-store POS networks). The system also comprises report generation mechanisms capable of querying relational databases comprising detailed records of the above-mentioned transactions and rendering a variety of customizable reports and marketing actions.

Unlike known electronic coupon management systems, the system disclosed herein enables providers (e.g., manufacturers) to create value, upon request by a consumer, in the form of a traceable electronic coupon, and associate (deposit) the electronic coupon with the consumer's account which is maintained at a centralized data center. Thereafter, the consumer is capable of redeeming the traceable electronic coupon at any retailer having access to the user's coupon account maintained at the centralized data center. Furthermore the system tracks the life of the traceable electronic coupon to acquire and maintain detailed information relating to the electronic coupon including: recording information regarding a purchase with which the electronic coupon is associated, verifying the authenticity of the transaction, and accounting for funds transfers (from the Manufacture to the Retailer) associated with the use/redemption of the electronic coupon.

With regard to the traceability of the electronic coupon, a unique ID is assigned to each issued electronic coupon. The unique ID supports a high degree of traceability to prevent fraud and improve compliance with the Generally Accepted Accounting Principles by tracking all transactions associated with each issued electronic coupon. Furthermore, the system issues at least one unique identification number for each Consumer, Manufacture, Retailer, and Retail Point of Sale (POS) System associated with, or linked to, the electronic coupon system.

Figure 1:
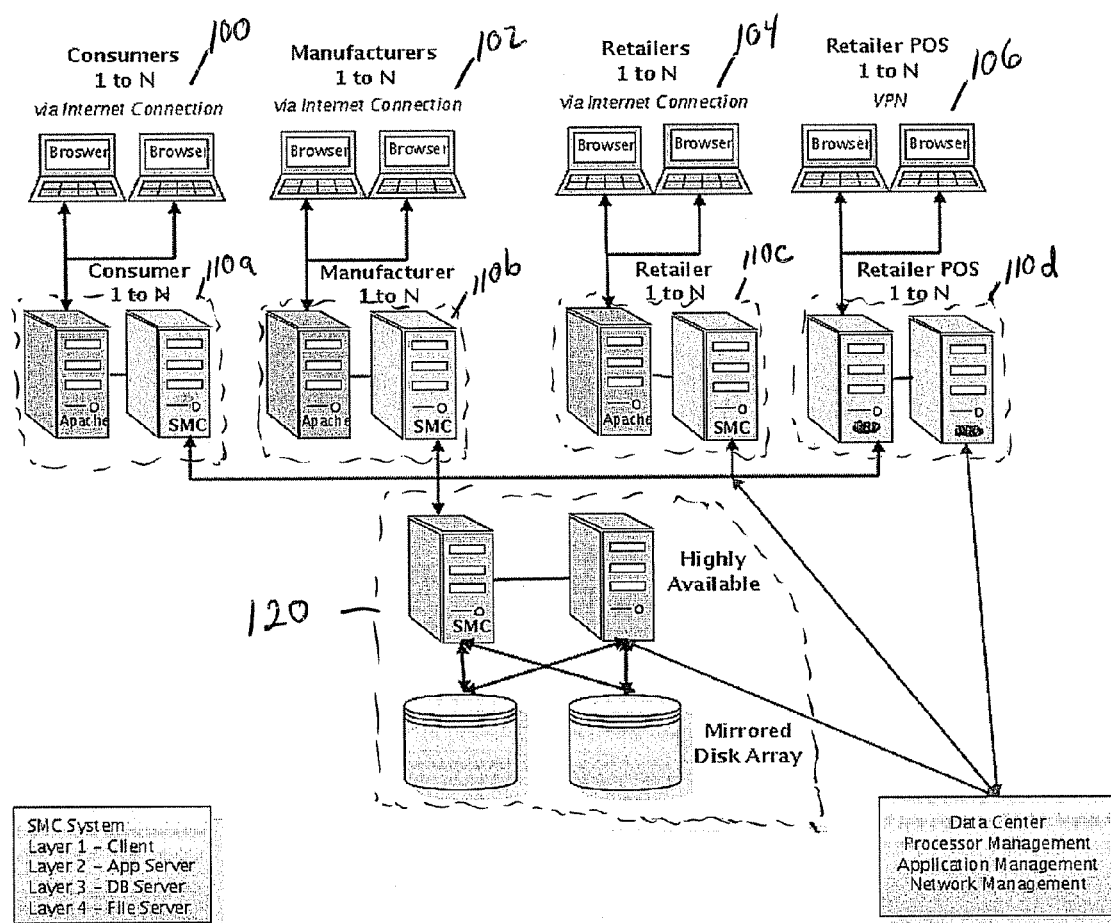
FIG. 1 is a schematic drawing depicting a system embodying the present invention in the form of multiple computer systems coupled to a centralized electronic coupon management system.

Turning to FIG. 1, the electronic coupon system described herein is supported by a highly available (minimal wait), high performance, n-tiered client/server application environment. Server-side system components feature performance load balancing and fail over capability. The servers are monitored to maintain a high level of transactional and reporting integrity.

The system, in an exemplary embodiment, comprises three client application types—Consumers 100, Manufacturers 102, and Retailers 104—that access the electronic coupon system services, supported by the above-mentioned servers, via the Internet using a standard Internet browser. Yet another type of client application, referred to herein as Retail Point of Sales (POS) System applications 106, accesses the electronic coupon system server via the Internet through a Virtual Private Network (VPN) tunnel. The Retail POS applications 106 incorporate a task-specific interface described further herein below.

The application servers 110a-d process requests from each of the four above-identified types of clients (i.e., Consumer, Manufacturer, Retailer and Retail POS). The application servers analyze each incoming request, and rout the request to an appropriate type of application server. Each application server cluster is scalable to handle potentially millions of simultaneously pending requests. Each of the application servers 110, in turn, submits database transaction requests (to retrieve or write data) to a high performance database server 120 which supports all of the Application Servers. The database server 120 is, by way of example, a high performance, highly available database server cluster that, with a mirrored data file disk array.

In an exemplary embodiment each of the major system components (network, software applications, and computer processors) are externally monitored to perform error handling and error recovery when required for any of the client or server applications mentioned herein above with reference to FIG. 1.

The system supports generating electronic coupon offers in a variety of ways. The system supports creating a coupon, under direction from a Manufacture (account), via Manufacturer client application 102, for offer to a set of Consumers (consumer accounts) that are registered with the electronic coupon system. The use of capitalization in Consumer, Manufacture, and Retailer is intended to identify "accounts" of the particular types. Once issued, the electronic coupons are redeemable through any of the retail POS outlets of Retailers (accounts) that are configured to participate in the electronic coupon system. Additionally, the electronic coupon system supports creating a coupon, under direction from a Manufacturer, for any particular Consumer that participates in electronic coupon service. Once issued, the electronic coupons are redeemable by the particular identified Consumer (and only that Consumer) at any retail POS outlet of a Retailer that participates in the electronic coupon system.

With regard to auditing/monitoring/reviewing coupon redemptions, the electronic coupon system supports reviewing, through the Manufacturer client applications 102, a list of electronic coupons created by the Manufacturer and information about the Consumers that have acquired the particular electronic coupons. Also, the electronic coupon system supports reviewing, through the Manufacturer applications 102, a list of electronic coupons that have been redeemed and information about the Retailers through which the corresponding manufacturer's electronic coupon instances have been redeemed.

With regard to the Consumer applications 100, the system supports designating coupons, issued via several differing Manufacturers, by a single Consumer via one of the Consumer applications 100. A user associated with the consumer account to which the electronic coupons issued subsequently redeems the electronic coupons through any registered/participating Retailer via one of the Retailer POS applications 106. The electronic coupon system supports reviewing, by the consumer applications 100, their associated list of previously issued electronic coupons and associated information (e.g., total value, expiration dates, etc.). Any registered consumer, through a corresponding one of the Consumer applications 100 can review their own list of previously issued/unexpired electronic coupons and information about a Manufacturer through which the particular electronic coupons issued. The electronic coupon system enables users, through the consumer applications 100, to review the list of redeemed electronic coupons for a Consumer and information about a Retailer through which particular coupons were redeemed. Any Consumer can "opt-in" to a number of types of electronic coupon offered by Manufacturers via their corresponding manufacturer applications 102 that participate in the electronic coupon service supported by the exemplary system.

With regard to the retailer applications 104 through which Retailer operate, the electronic coupon system supports redemption of previously issued electronic coupons via the Retailer POS applications 106. Furthermore, the electronic coupon system supports reviewing, via the Retailer applications 104, records maintained by the database server 120 corresponding to electronic coupons redeemed through identified retailer POS applications 106 (associated with a particular Retailer). Thus, a retailer is able to review records, associated with a corresponding Retailer account, containing information relating to the electronic coupons that have been redeemed by Consumers via the Retailer's POS machines. The system supports coupon redemption records containing a wide variety of information that, in turn, facilitate supporting a wide variety of electronic coupon database queries that can designate/arrange responsive coupon information according to Manufacturer, Consumer, product, etc.

Figure 2:
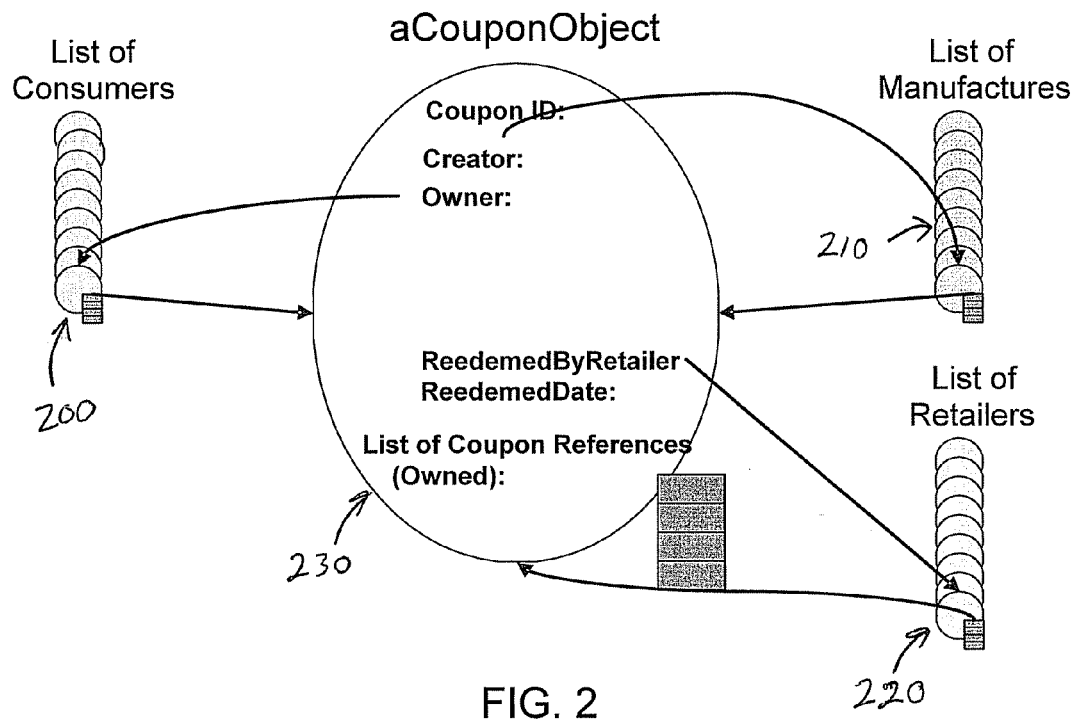
FIGS. 2 and 3 are schematic drawings depicting the relationships between various objects of an exemplary electronic coupon system.
Figure 3:
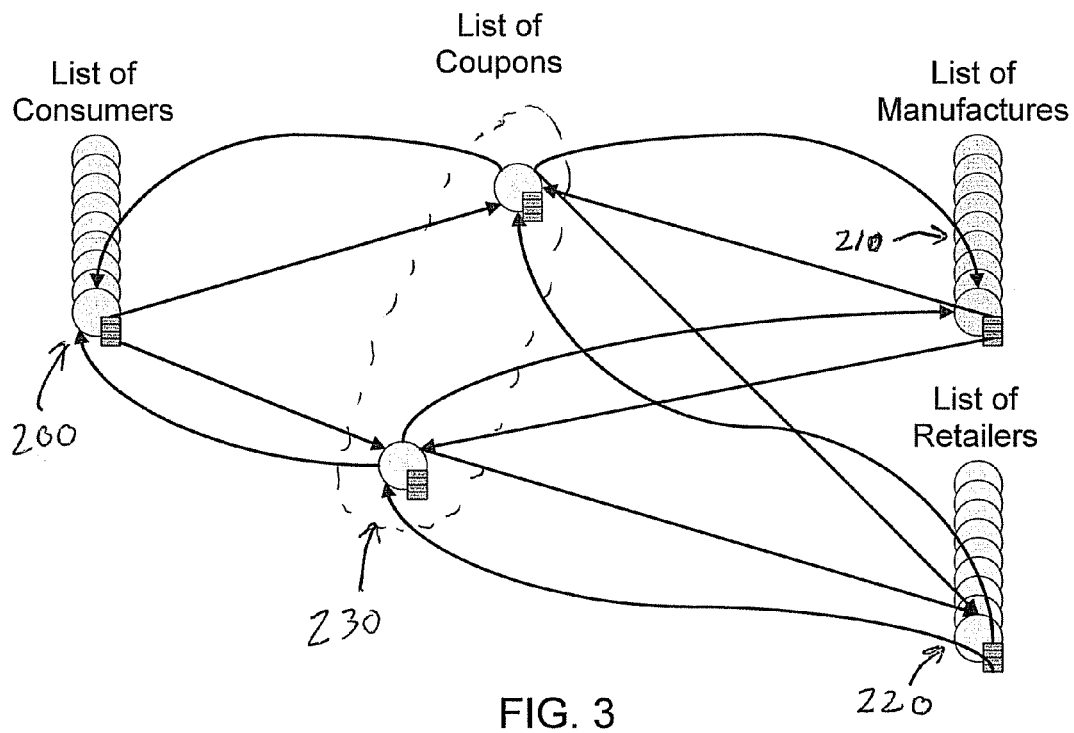

Having described an exemplary system arrangement from the point of view of an exemplary set of interacting client/server applications and an associated database, attention is now directed to FIGS. 2 and 3 that illustratively depict a partial set of fields associated with an exemplary electronic coupon object and its relationship to other system database objects including: a Consumer to whom the coupon has issued, a provider (e.g., Manufacturer) of an associated product/service, a Retailer where the coupon was redeemed. The exemplary object includes further fields such as timestamps indicating issue date, expiration date, redemption date, etc. FIG. 3 is indicates the presence of multiple electronic coupon objects (in fact millions) that are contemplated to exist in the system at any point in time.

The electronic coupon system is based upon a highly referential object-oriented database that maintains several lists including: Consumers, Manufacturers, Retailers, and coupons. Each consumer account object is associated with a corresponding, personalized, list of electronic coupon objects. A Consumers list 200 comprises a set of Consumer objects wherein each Consumer object includes, among other things, a set of references to coupon objects created (issued) to the particular Consumer object in the Consumers list 200. A Manufacturers list 210 comprises a set of Manufacturer account objects wherein each Manufacturer account object comprises a list of references to previously issued electronic coupon object instances. Alternatively, the list of coupon references is limited to redeemed coupon instances. A Retailers list 220 comprises a set of Retailer account objects wherein each Retailer account object comprises a list of coupons redeemed by one of the Retailer POS outlets associated with the Retailer.

An electronic coupon object 230 references (and is referenced by) an object within each of the Consumers list 200, Manufacturers list 210 and Retailers list 220. Thus for each electronic coupon, the Consumer redeemer can be established. Furthermore the electronic coupon object identifies a manufacturer of the coupon's associated product. Finally, the electronic coupon object references/identifies a retailer that redeemed the electronic coupon. The aforementioned combination of object references enables subscribers of the system, regardless of point of entry into the system (from Manufacturer, from Consumer, from Retailer, or from Coupons) to traverse all related information maintained by the database server 120 about a particular electronic coupon.

Accessing the content of the electronic coupon objects maintained by the database server 120 is described herein below with reference to particular examples.

Consumer Example—a consumer, among other things, views all electronic coupons issued to the Consumer, the Manufacturer of the product with which the electronic coupons are associated, and a Retailer that redeemed the coupon (assuming the electronic coupon has been redeemed). Therefore a consumer traverses the list of electronic coupons issued to the consumer's account, and through the references contained within the electronic coupon the consumer determines the Manufacturer of the related product and potentially a redeeming Retailer (assuming the coupon was redeemed).

Manufacturer Example—a manufacture, among other things, views all of the electronic coupon object instances with which the manufacturer's account is associated, the Consumers that have the electronic coupons, and the Retailers that have redeemed the electronic coupons. Therefore an agent of the manufacturer traverses a list of electronic coupons associated with the Manufacturer and follows the references from those electronic coupon object instances to consumer accounts that possess the coupons and the retailer accounts that redeemed the electronic coupons to obtain further information about the Consumers and or Retailers and take marketing actions accordingly.

Retailer Example—a retailer, among other things, views all of the electronic coupons the retailer redeemed, the Consumers that redeemed the electronic coupons, and the Manufacturer associated with the electronic coupons. Therefore an agent of a retailer traverses a retailer account's list of redeemed electronic coupons to determine information such as associated Manufacturers and Consumers that redeemed them in order to obtain additional information about the Manufacturers and/or Consumers.

Database Structures Tables/Schema:

Having described the general arrangement of an exemplary electronic coupons system, attention is directed to a set of tables centrally maintained by the database server 120 to support a set of events associated with the lifetime management of electronic coupons described herein below. The illustrative example is based upon a highly referential (relating a variety of entity types to an electronic coupon) object-oriented data model. The data elements and their associated cross-references facilitate creating and/or tracing an auditable path of each redeemed electronic coupon through a series of states. Various data structures support recreating the state of each electronic coupon at any point in time—not just its current status.

Turning to FIG. 4*a*, a set of fields associated with a Companies table record 300 are listed. The data elements associated with the Companies table record 300 support administering manufacturer and retailer profiles and account definitions. In an exemplary embodiment, each manufacturer or retailer company is uniquely identified by a company identification integer value stored within a 'companies_id' field. A 'name' field stores a string value specifying the name of a company. A 'coupon_code' field holds an integer value uniquely identifying a code appended to each coupon issued by a manufacturer or redeemed by a retailer. A 'type' field contains a string value identifying whether the company is a manufacturer or a retailer and a specific sub-category of company to which a company belongs. A 'created_at' field stores a value that specifies a date and time at which a particular company account record was created in the table, and an 'updated_at' field stores a value that specifies a date and time when the account record was last changed. Additional fields contain integer values that facilitate contacting an appropriate company contact via the mail. Such fields include: an 'accounting_address_id', a 'department_id', a region_id; an hq_address_id. A 'billing_cycle' specifies the frequency with which a manufacturer is billed in association with coupon campaigns.

Turning to FIG. 4*b*, a set of fields associated with a Categories table record 310 are listed. The data elements associated with the Categories table record 310 facilitate categorizing coupon campaigns (also referred to herein as ad campaigns) by, for example, product types. A 'categories_id' field stores an integer value uniquely identifying a particular category. A 'name' field stores a string value specifying the name of a category. A 'parent_id' field stores an integer value specifying a parent category_id to support a hierarchical arrangement of categories and sub-categories. A 'position' field stores an integer identifying the level within a category tree hierarchy.

Turning to FIG. 4c, a set of fields associated with a Users table record 320 are listed. The data elements associated with the Users table record 320 facilitate management of authorized users and retailers within the electronic coupon system. In an exemplary embodiment, each registered user is uniquely identified by an integer value stored within a 'users_id' field. A 'login' field stores a string value that constitutes a user's logon name. An 'email' field stores a string value specifying a user's email address. An 'encrypted_password' field stores a string corresponding to a user's encrypted password. The encrypted password is generated by taking the user's password (entered by them) and combining it with a random generated string (stored in the salt field). This method guarantees a uniquely generated encryption method for generating the encrypted password. A 'salt' field stores a string containing the aforementioned random values. A 'created_at' field contains a value specifying the date and time that a particular user record was created, and an 'updated_at' field contains a value specifying when the user record was last updated. A 'remember_token' field stores a string corresponding to the user's logon password for purposes of automatically filling in the password field in a logon dialog for gaining access to the system. A 'remember_token_expires_at' field specifies a date and time at which a saved password expires. A 'first_name' field and 'last_name' store string values specifying a user's name.

Additional fields of a Users table record 320 facilitate storing company information for retailer users of the system. A 'company_id' field stores an integer identifying a retailer with which the user is associated. A 'department_id' field, a 'store_id' field, and a 'region_id' field store optional integers for specifying a particular location of a particular user within a company.

Turning to FIG. 4d, a set of fields associated with a Roles_users table record 330 are listed. The data elements associated with the Roles_users table record 330 facilitate connecting 'user_id' values to particular user roles. A 'user_id' stores an integer uniquely identifying a user. A 'role_id' stores an integer corresponding to a particular role. The record 330 also includes a 'created_at' field and an 'updated_at' field specifying corresponding date and time values.

Turning to FIG. 4e, a set of fields associated with a Roles table record 340 are listed. The data elements of the Roles table record 340 facilitate defining a uniquely identified role. A 'roles_id' field stores an integer uniquely identifying a role. A 'name' field stores a string identifying a role by name. An 'authorizable_type' field stores a string identifying the capability associated with the users role. For example a manager can perform many types of action. A 'created_at' field and an 'updated_at' field specify corresponding date and time values. A 'display_name' stores a string listing a display name for a role.

Turning to FIG. 4f, a set of fields associated with a Departments table record 350 are listed. The data elements of the Departments table record facilitate describing a department of a company within the electronic coupon system. A 'departments_id' field stores an integer value uniquely identifying a department within a particular company. A 'name' field stores a string value a chosen name for the department. A 'parent_id' field stores an integer value identifying a parent department. This is because each department can be a sub-department of a parent department. For Example the Paper Department can have two sub-departments, one for Paper Towels, the other for Toilet Paper, however both belong to (their parent department is) the paper department. A 'description' field stores a string value briefly describing a department to aid its identification, for example, when presented in a list of departments in a list box of a manufacturer user interface. A 'budget' field stores a decimal value indicating a potential cap for the value of all coupons.

Turning to FIG. 4g, a set of fields associated with a Regions table record 360 are listed. The data elements of the Regions table record facilitate describing a geographic region for a company that is associated with multiple regions. A 'regions_id' field stores an integer uniquely identifying a region with regard to a particular company. A 'name' field stores a string value for a chosen name for the region. A 'parent_id' field stores an integer value identifying a parent region. This is because each region can be a sub-region of a parent region. For Example Texas (a region) can have four sub-regions North, East, South, and West. And each of the four sub-region has a parent region (i.e., Texas). A 'description' field stores a string value briefly describing a region to aid its identification, for example, when presented in a list of regions in a list box of a manufacturer user interface.

Turning to FIG. 4h, a set of fields associated with a Stores table record 370 are listed. The data elements of the Stores table record facilitate describing a store for a company having multiple stores. A 'stores_id' field contains an integer value uniquely identifying a store with regard to a company that has many stores. A 'name' field stores a string value for a chosen store name. A 'region_id' field stores an integer value identifying a region (see regions_id field of FIG. 4g) within which the store is located. A 'retailer_id' stores a a unique integer value identifying a particular retailer record (i.e., a Store) in a Users table (see FIG. 4c above) with which the store is associated. A 'disabled_at' field stores a date and time at which a particular store is excluded from use of the electronic coupons system, and a 'disabled_by' field stores an integer identifying the administrator user that initiated the exclusion. A 'ref_id' field stores a string value that the retailer currently uses to identify the store location.

Turning to FIG. 4i, a set of fields associated with a Point of Sales table record 380 are listed. The data elements of the Point of Sales table record 380 facilitate describing a particular point of sale device/unit. A 'point_of_sales_id' stores an integer value uniquely identifying the POS unit in a retailer store entity. A 'name' field stores a string value for a chosen POS unit name. A 'store_id' field contains an integer value linking the POS unit to a store record (see, FIG. 4h). A 'disabled_at' field stores a date and time at which a particular POS unit is excluded from use of the electronic coupons system, and a 'disabled_by' field stores an integer identifying the administrator user that initiated the exclusion. A 'ref_id' field stores a string value that the retailer currently uses to identify the POS system within the Store.

A set of records are now described that support managing by manufacturing companies of product groups and product images. Turning to FIG. 4j, a set of fields associated with a Product Groups table record 390 are listed. The data-elements of the Product Groups table record facilitate defining a product group within the electronic coupon system. A 'product_group_id' stores an integer value uniquely identifying the product group within a manufacturing company. A 'name' field stores a string value for a chosen product group name. A 'company_id' field stores an integer identifying a company record (see, FIG. 4a) in order to facilitate linking the Product Group table record 390 for a particular product group to a particular Company record. A 'description' field stores a string value providing a description of the product group to aid its identification to a user. A 'default_image_id' field stores an integer value linking the product group record to a default image. A 'ref_id' field stores a string value that the retailer currently uses to identify the product group. This number is typically a 3 digit number.

Turning to FIG. 4k, a set of fields associated with a Product_UPC_groupings table record 400 are listed. The data elements of the Product_UPC_groupings table record 400 facilitate connecting UPC records (see, FIG. 4l) to corresponding product group records (see, FIG. 4j). Each record includes a 'product_group_id' field for storing an integer value identifying a product group record, and a 'upc_id' field for storing an integer value identifying a UPC record.

Turning to FIG. 4l, a set of fields associated with a UPCs table record 410 are listed. The data elements of the UPCs table record 410 facilitate globally defining a product identified by its UPC. A 'upc_id' field stores an integer value corresponding to a product's UPC. A 'name' field stores a string value for a chosen product name. A 'check_digit' field stores an integer value that is used as the UPC check digit. Each UPC code has a check digit that computers use in order to verify the accurate transition of the other numbers. A 'company_id' field stores an integer corresponding to the unique identifier for a company record stored in the company record table (see, FIG. 4a). A 'code' field stores a string value.

Turning to FIG. 4m, a set of fields associated with an Image_product_mappings table record 420 are listed. The data elements of the Image_product_mappings table record 420 facilitate connecting Product_image records (see, FIG. 4n) to Product_group records (see, FIG. 4j). A 'product_group_id' field stores an integer value identifying a particular record in the Product_group table, and a 'product_image_id' field stores an integer value identifying a particular record in a Product_image table.

Turning to FIG. 4n, a set of fields associated with a Product_images table record 430 are listed. The data elements of the Product_images table record 430 facilitate defining a product image for use with an electronic coupon (advertisement). A 'product_image_id' field stores an integer value uniquely identifying a product image within a particular identified manufacturer company. A 'parent_id' field stores an integer value. A 'company_id' field stores an integer identifying a corresponding company record (see, FIG. 4a) in a Companies table. A 'name' field stores a string value identifying the associated product image by name. A 'filename' field stores a string value specifying a name of a file containing the product image data. A 'content_type' field stores a string value that indicates the type of content stored in this section (e.g., jpeg, tiff, etc). A 'size' field stores a string value specifying the size (in bytes) of the image to be stored. A 'width' field and a 'height' field store a string value defining the dimensions of the image.

A set of records are now described that support managing ad (electronic coupon) campaign distribution. Turning to FIG. 4o, a set of fields associated with a Campaign areas table record 440 are listed. The data elements of the Campaign areas table record facilitate defining a campaign area. The campaign area definition is thereafter used within the electronic coupon system to specify all of the zip codes (areas) where the campaign can be distributed. If a consumer resides in the campaign distribution area, then the consumer can access the campaign. A 'campaign_area_id' field stores an integer value uniquely identifying a campaign area within the scope of a particular manufacturing company. A 'name' field stores a string value identifying the campaign area by name.

A 'description' field stores a string value providing a description of the particular campaign area for presentation in a coupon management user interface. A 'company_id' stores an integer value that identifies a corresponding company record within the Companies table (see, FIG. 4a).

Turning to FIG. 4p, a set of fields associated with a Campaign_area_mappings table record 450 are listed. The data elements of the Campaign_area_mappings table record 450 facilitate linking postal codes (see, FIG. 4q) to campaign areas (see, FIG. 4o). A 'campaign_area_id' field stores an integer value identifying a record in the Campaign areas table containing records of the type described above with reference to FIG. 4o. A 'postal_code_id' field stores an integer value identifying a record in the Postal codes table containing records of the type described below with reference to FIG. 4q.

Turning to FIG. 4q, a set of fields associated with a Postal_codes table record 460 are listed. The data elements of the Postal_codes table record 460 facilitate associating zip codes with name strings and thereafter referencing the records by a system-wide unique identification assigned to the combined zip code and descriptive name. A 'postal_codes_id' field stores an integer value uniquely identifying the postal code descriptor record throughout the system. A 'name' field stores a string value identifying the postal code by name, and a 'zip_code' field stores a string value corresponding to the numerical zip code (e.g., a 5 digit string).

A set of records are now described that support management of issued coupons in the context of an ad (e-coupon) campaign. In general, each electronic coupon record, corresponding to an electronic coupon instance, references an Ad campaign record from which the electronic coupon issued. Turning to FIG. 4r, a set of fields associated with an Ad campaign table record 470 are listed. The data elements of the Ad campaign table record 470 facilitate defining an electronic coupon campaign for a particular manufacturer from which electronic coupons issue. An 'ad_campaign_id' field stores an integer value uniquely identifying the electronic coupon campaign within the scope of an identified manufacturer. A 'company_id' field stores an integer value identifying a company record (see, FIG. 4a) of a manufacturer with which the identified campaign is associated. A 'name' field stores a string value identifying the coupon campaign by name. A 'campaign_start_date' field and a 'campaign_end_date' field store values identifying the date and time for the beginning and end of an electronic coupon campaign. A 'created_at' field stores a date and time identifying when a coupon campaign record was initially created, and an 'updated_at' field stores a date and time when a coupon campaign record was last updated. A 'category_id' field stores an integer value identifying an associated category record within a Categories table (see, FIG. 4b). A 'display_text' field stores a string value containing descriptive text for the ad campaign. A 'web_activation_date' field and a 'web_inactivation_date' field store values identifying the start time and end time for a period wherein the electronic coupon offer will be presented to consumers over the Internet.

With continued reference to FIG. 4r, a 'coupon_value_id' field stores an integer value referencing a record in a Coupon values table (see, FIG. 4t) describing the electronic coupon's face value. A 'campaign_area_id' field stores an integer value referencing a record in a Campaign area table (see, FIG. 4o). A 'product_group_id' field stores an integer value referencing a record in a Product group table (see, FIG. 4j) that identifies a set of applicable products of a manufacturer for the campaign. A 'forced_web_inactive' field stores a date and time that an Internet-based electronic coupon offer is rendered inactive. A 'forced_web_inactive_by' field stores an integer value identifying an entity that rendered the electronic coupon offer inactive. An 'assumed_redemption_value' field stores a decimal value specifying a redemption value for the coupon. An 'approver_id' field stores an integer value referencing a record in a Users table (see, FIG. 4c) corresponding to the user that approved submission of the electronic coupon. An 'approved_at' field stores a date and time at which the electronic coupon was approved by the identified user. A 'department_id' stores an integer value referencing a record in a Departments table (see, FIG. 4f). A 'budget' field stores a decimal value establishing a desired limit on the total value of redeemed electronic coupons. A 'product_image_id' field stores an integer value referencing a record in a Product images table (see, FIG. 4n). A 'creator_id' field stores an integer value referencing a record in a Users table (see, FIG. 4c) corresponding to a creator of an electronic coupon campaign record.

Turning to FIG. 4s, a set of fields associated with a Coupons table record 480 are listed. The data elements of the Coupons table record 480 facilitate defining an electronic coupon instance assigned to a specified user account. A 'coupons_id' field stores an integer value uniquely identifying a coupon issued according to a particular ad campaign. A 'consumer_id' field stores an integer value referencing a record in a Users table (see, FIG. 4c) identifying the consumer account to which the electronic coupon issued. A 'retailer_id' field stores an integer value referencing a record in a Users table (see, FIG. 4c) for a retailer user of the system corresponding to a retailer where the electronic coupon was redeemed. A 'serialnumber' field stores a string value. A 'redeemed_date' field stores a data and time that the coupon was redeemed at the identified retailer. A 'purchasedproduct' field stores a string value identifying the product to which the electronic coupon was applied. A 'created_at' field stores a value indicating a date and time at which the electronic coupon issued to the identified consumer/user. An 'updated_at' field stores a data and time that a coupon was updated to indicate redemption of the coupon in association with the purchase of the identified purchased product. An 'ad_campaign_id' field stores an integer value that references a record in the Ad Campaign table (see, FIG. 4r) corresponding to the campaign within which the electronic coupon was issued. An 'invoice_id' field stores an integer value reference a record in an Invoices table (see, FIG. 4v) representing a billing to the manufacturer for payment of the coupon's redeemed value. A 'state' field stores an integer value corresponding to a state where the electronic coupon was redeemed. A 'point_of_sale_id' field stores an integer value corresponding to a record in a Point of sales table (see, FIG. 4i) indicating the particular check out location where an electronic coupon was redeemed. A 'redemption_value' field stores a decimal value indicating the redeemed value of the coupon (for instances where a single coupon has different redemption value based upon the number of products purchased).

Turning to FIG. 4t, a set of fields associated with a Coupon values table record 490 are listed. The data elements of the Coupon values table record 490 define a coupon face value. A 'face_value' field stores a string value indicating a monetary value for an associated coupon. A 'code' field stores a string value that can be used in place of the value. Some codes represent the phrase buy one get one free, which has not true "face value".

Turning to FIG. 4u, a set of fields associated with a Consumers table record 500 are listed. The data elements of the Consumers table record 500 store demographic and contact information associated with individual consumer accounts. A 'consumers_id' field stores and integer value referencing a record in the Users table (see, FIG. 4c). A 'first_name' field and a 'last_name' field store string values that, in combination, comprise the user's name. An 'address' field and 'address2' field store string values comprising a user's mailing street address. The remaining portions of a user's mailing address are stored in a 'city' field, 'state' field, 'zip_code' field, and 'country' field. Other user-defining string value fields of a Consumers table record 500 include: a 'gender' field, a 'birthday' field, and an 'email' field. Similar to previously described records, consumer records also include a 'created_at' field and an 'updated_at' field that store date and time values indicating when the consumer record was initially created and a last time it was updated. A 'login' field specifies a login name string value, and a 'password' field specifies a password string.

Turning to FIG. 4v, a set of fields associated with an Invoices table record 510 are listed. The data elements of the Invoices table record 510 facilitate electronic invoicing manufacturer clients in association with coupon redemptions. An 'invoices_id' field stores an integer value uniquely identifying the electronic invoice system-wide. An 'amount' field stores a decimal value indicating the amount due. An invoiced_date' specifies a date on which the invoice issued to a manufacturer company. An 'invoiced_by' field contains an integer value that represent the retailer that "creates" the invoice. A 'paid_date' field stores a date on which the invoice was paid. A 'paid_by' field stores an integer referencing a record of a manufacturer in the Companies table (see, FIG. 4a) that paid the invoice. A 'posted_date' field stores a date when payment was posted (initiated). A 'posted_by' field stores an integer value referencing a record in the Users table (see, FIG. 4c) corresponding to the user that initiated posting the payment. A 'state' field stores an integer value identifying the state from which the payment was made. A 'payment_method' field stores a string value identifying a payment mode (e.g., bank debit, line of credit account, etc.). A 'payment_confirmation' field stores a string value comprising a confirmation code. A 'payer_id' field stores an integer value referencing a record in the Company Table 300 (user/manufacturer/company)] table corresponding to the entity that paid the invoice. A 'payee_id' field stores an integer value referencing a record in the companies table (see, FIG. 4a) corresponding to the recipient of the payment. A 'coupon_count' field stores an integer value identifying how many coupons were redeemed. A 'peer_invoice_id' field stores an integer value referencing another invoice record in the same table where the payee_id is SMC and the Payer_id is the same as this invoice. This is required because SMC gets paid for each coupon redeemed. Therefore, every time a Manufacturer is billed on behalf of a retailer for coupons, SMC bills the same Manufacturer for managing the transaction associated with those same coupons. A 'due_on' field stores a date on which payment of the invoice is due.

Having described in detail the contents of a highly referential relational database schema comprising a number of linked tables, maintained by one or more database servers, supporting a wide variety of complex queries for rendering a variety of reports and summaries, attention is directed to a description of functionality supported by various components identified in FIG. 1 that exploit the above-described relational database schema to carry out an electronic coupons management system supporting defining and implementing electronic coupon-enhanced ad campaigns.

The following briefly summarizes capabilities/functionality supported by the electronic coupons system. This list is not exhaustive. Furthermore, the listed capabilities can be combined to render additional functionality.

Create and Track Electronic Coupons—Each Coupon will have a Unique ID (i.e., serial number)

Create and Track Manufacturer Accounts—Each Manufacturer will have a Unique ID

Create and Track Consumer Accounts—Each Consumer will have a Unique ID

Create and Track Retailer Accounts—Each Retailer will have a Unique ID

Assign a Unique Electronic Coupon to a Unique Consumer—By creating a coupon instance identifying a particular Consumer Validate Electronic Coupon with Purchased Product—By comparing a UPC of a purchased product to a list of acceptable UPC's designated by an electronic coupon Track and Transfer funds associated with every Electronic Coupon—through account resolution processes periodically performed after auditing coupon redemption data Maintain Historical transactional level data for all Subscribers (Consumer, Manufacturer, and Retailer) to the service—facilitates performing a variety of statistical and trend analyses for evaluating campaigns and detecting fraudulent activity Maintain Historical transactional level data (and events) for all Electronic Coupons—facilitates statistical and/or trend analysis for evaluating campaigns and detecting fraudulent redemption activity Events-Driven Operations The exemplary system, disclosed by way of example herein, is event/function-driven. The system events/functions comprise five categories: Manufacturer, Consumer, Retailer, Retail Point of Sale, and SaveMyCoupon (SMC) System. Each of these categories is described herein below with reference to FIGS. 5a-e. The data elements associated with the events described herein below have been previously described above with reference to FIGS. 4a-4v.

Turning to FIG. 5a, a set of Manufacturer events/functions associated with the interactions between the Manufacturer client applications 102 and Manufacture servers 110b are identified. The Manufacturer events and their associated functions facilitate creating electronic Ad Campaigns (electronic coupons), using the Ad Campaign definitions as templates for creating corresponding electronic coupons for Consumers (consumer accounts), and reimbursing Retailers (retailer accounts) for redeeming the electronic coupons. Manufactures, through their associated manufacturer accounts (or Manufacturers), add and maintain their internal authorized users, set up parameters for creating Ad Campaigns (lists of valid Universal Product Codes, lists of valid Product Images, Ad Campaign Distribution Areas), create Ad Campaigns (electronic coupons), and monitor and manage the Ad Campaigns. The manufacturer through their manufacturer accounts: monitor, manage, and pay invoices for the electronic coupons that have been redeemed by Consumers via the Retailer POS client applications.

Access to a manufacturer's account is specified through configuration of the user accounts associated with the Manufacturer in accordance with a Manage Authorized Users event 500 supporting a wide variety of configuration functions relating to specifying authorized users under a Manufacturer. A system administrator assigns roles and departments to users to manage access to the Manufacturer's data. The roles determine a user's authority, while the department defines a scope of the specified user's authority. The following are exemplary definitions of supported Manufacturer user roles:

Manufacturer System Administrator—primary function is to manage user accounts and system parameters for the Manufacturer (account).

Campaign Creator—creates and manages Ad Campaigns in a specified department. Such users do not have the ability to "Approve" an Ad Campaign Campaign Manager—"Approve" previously created Ad Campaigns. Campaign Managers have access to all summary and detail data for the Ad Campaigns for a department.

Accounting Manager—accesses all accounting information and authorized to pay invoices. Account Managers can also view all Ad Campaign management information, but Accounting Managers cannot Create or Approve a Campaign.

A Manage Departments event 502 defines departments. A Manufacturer System Administrator uses department definitions to specify a scope of authority for a user. Departments are hierarchical, and can contain other Departments. The Manufacturer's System Administrator assigns departments to users and Ad Campaigns. User assigned to the same department as a particular Ad Campaign can manipulate the Ad Campaign based on the user's assigned role.

A Manage Product Groups event 504 defines product groups. A Manufacturer's System Administrator is responsible for maintaining lists, or groups, of Universal Product Codes (UPCs) that are sent to the Retail POS client applications 106 for product validation of an electronic coupon. Each defined Product Group specifies a list of valid UPCs. Through the Manage Product Groups event 504, the Manufacturer's System Administrator adds UPCs to the system and assigns the Product Groups to one or more of the Manufacturer's Product Groups. The Product Groups are used by an Ad Campaign creator when defining an Ad Campaign in accordance with a Create Ad Campaigns event 510 (described hereinafter).

A Manage Product Images event 506 defines images for use with Ad Campaigns. A Manufacturer's System Administrator maintains a list of valid product image files displayed in association with Ad Campaigns (electronic coupon templates) via the Consumer client applications 100 when they access an electronic coupon offer web site. The Manufacturer's System Administrator adds product image files and then assigns the image files to one or more Product Groups. Each Product Group has an associated list of product image files. Each Product Group has a default product image file in an associated list of image files. The product images are used by a Campaign Creator user when creating and Ad Campaigns.

A Manage Ad Campaign Distribution Areas event 508 defines geographic distribution regions for particular Ad Campaigns. A Manufacturer's System Administrator manages a list of postal ZIP codes that define a geographical scope for electronic coupon distribution. A Manufacturer's System Administrator assigns valid postal ZIP codes to Ad Campaign/electronic coupon distribution areas. The Ad Campaign distribution areas are used by Campaign Creators when Creating Ad Campaigns. When a Consumer logs into the SMC System their postal ZIP code (located in their Account information file) is used to match against a ZIP code in the Ad Campaign distribution area assigned to an Ad Campaign, in order to view available electronic coupons for the ZIP code (or any other relevant region of interest).

A Create Ad Campaigns event 510 defines Ad Campaigns corresponding to electronic coupon offers. A Manufacturer's Campaign Creator creates a template for a simple rule based promotion (i.e., an Ad Campaign). For example: purchase product X and receive $1.00 off the purchase price. When a Consumer requests an electronic coupon, an electronic coupon is instantiated from the Ad Campaign and is assigned a unique coupon instance ID within the scope of the Ad Campaign. A reference to the electronic coupon is placed in the consumer's account and in the Manufacturer's list of issued electronic coupons. Some information is unique to the electronic coupon, while other information is obtained by referencing the Ad Campaign (the template). The electronic coupon's reference to a source Ad Campaign avoids duplication of information. See FIGS. 4r and 4s for exemplary Ad Campaign and electronic coupon record structures. An exemplary user interface for creating or editing (existing) Ad Campaigns is provided in FIG. 17. In general, the depicted user interface comprises a set of text field identifiers for defining and Ad Campaign. It is noted that drop down lists are provided for specifying: Product Group, Coupon Value, Product Image, Campaign Area, Category, and Department. In an exemplary embodiment, the following information is needed to create an Ad Campaign and is provided before the Ad Campaign is activated.

Unique Ad Campaign ID: This is a required value field for the purpose of auditing. It is generated by a system server (e.g., the Manufactures within the system.

Manufacturer's ID: This is a field that is used for tracking the accounting information associated with the electronic coupons. The Manufacturer ID is also passed to a requesting one of the Retail POS client applications 106 during an electronic coupon redemption. The Manufacture's ID is fixed (i.e., it can't be edited) and is the Manufacturer ID that is set up by an administrator of the electronic coupons system when the Manufacturer was added/enrolled.

Campaign Department: This is the same Department associated with the Campaign Creator. The campaign department value is assigned by the electronic coupon system based on the department of the Campaign Creator that creates the Ad Campaign. The Campaign Department designation determines scope of authority. Only members of the designated department can view, edit, approve, deactivate, or delete a particular Ad Campaign.

Campaign Name: This is an optional text field that will be displayed to help a user identify/differentiate the Ad Campaign.

Web Activation Date: This is the date the Ad Campaign can be posted electronically. This field is consulted to verify, in response to a request from another site to "Save" an electronic coupon, that issuance of an electronic coupon in a consumer's account is permitted.

Web Inactivation Date: This is the date the Ad Campaign is no longer posted electronically. If the Web Inactivation Date has passed, then a Consumer cannot "Save" an electronic coupon—the Ad Campaign is in an Inactive state. If the Web Inactivation Date has passed, then the Ad Campaign will no longer be displayed to users via the Consumer applications 100.

Coupon Start Date: This is the date the electronic Coupon becomes valid and can be redeemed via the Retailer POS applications 106.

Coupon Expiration Date: This is the date the electronic Coupon becomes invalid and can no longer be redeemed at a retailer. After the coupon expiration date has passed, corresponding electronic coupon instances will be removed from the Consumer's "My Coupons" List and automatically archived.

Product Group Code: This is a field that is used to select the group of Universal Product Codes (UPCs) that are passed to the Retail POS. The Product Group code approach to designating products associated with an Ad Campaign allows the Campaign Creator to select several UPCs for an Ad Campaign by just selecting one Product Group Code. The Product Group Code is selected from the (drop down) list of valid "Product Group Codes" managed by the Manufacturer's System Administrator.

Image: This specifies a file containing an image that will be displayed with the Ad Campaign via the Consumers applications 100. An image file is selected from a list of Product Images for an associated Product Group Code. The Manufacturer's System Administrator manages the lists of images. A default image is specified for each Product Group Code. If the default image is not chosen, the pull down menu contains a list of valid alternative images associated with a currently specified Product Group Code for an Ad Campaign.

Product Categories: This is a list of parameters that are used to describe/categorize the Ad Campaign. Consumers use this type of information for sorting and "opt-in" criteria on a home site for the electronic coupon system. For Example: If a Consumer user clicks on a "Frozen" Category on the home electronic coupon Web site, then all Ad Campaigns that have categories that match "Frozen," will be displayed. Ad Campaign Categories are selected from a list of valid product categories managed by the electronic coupon System Administrator.

Campaign Distribution Area: This is a list of valid ZIP codes where the Ad Campaign is to be distributed (presented to qualified users identified as residing within one of the specified ZIP codes). This is an area (list of ZIP codes) that is selected from the List of Valid "Ad Campaign Distribution Areas" managed by the Manufacturer's System Administrator. A ZIP code in the list must match a Consumer's ZIP Code in order for the Consumer to be able to see the Ad Campaign, and "Save" the electronic Coupon into their Account.

New Product: This is a flag that indicates that the Ad Campaign is associated with what is considered to be a new product, and the system potentially applies special procedures in the display and presentation of the associated electronic coupon offers to Consumers. For example, new products display a Banner across the top of the Ad Campaign image block to notify the Consumer that this is a new product.

Display Text: This is a free-formed text field that allows the Ad Campaign Creator to specify a short text string they want displayed with the Ad Campaign on electronic coupon offers presented via the Consumer applications 100.

Coupon Value: This is a field specifies the value of the electronic Coupon (e.g., $1.00 off). It will be displayed on the Ad Campaign offer presented via the Consumer applications 100. This is a field that is passed to the Retail POS applications 106 to provide the Consumer with a discount/award. The value can consist of several types of data (e.g., dollar off, percent off, get one free). This can be used to pre-populate the Assumed Redemption Value field.

Assumed Redemption Value: This is a temporary numeric value associated with the Coupon Value field. It is used to calculate values for the Ad Campaign, prior to the Ad Campaign's associated electronic Coupons being redeemed. This field is used for calculating the "Budget" for electronic coupons, and for other forecast reporting purposes. The Assumed Redemption Value field is auto-populated with a default value associated with the Coupon Value. If this field cannot be auto-populated, then the Campaign Creator must add an Assumed Redemption Value before the Ad Campaign can be completed. For example, if the Ad Campaign's Coupon Value is "Buy One-Get One Free", selecting the "Coupon Value" cannot assign an Assumed Redemption Value, therefore, an Assumed Redemption Value is provided in order to calculate an estimated budget for electronic coupons having a non-fixed monetary value.

Budget for Coupons: This is the amount of money that is budgeted for the Ad Campaign. In an exemplary embodiment, the system can calculate the "Maximum Number of Coupons" to be issued based on the budgeted amount. The system calculates the "Maximum Number of Coupons" to be issued based on the "Coupon Value" and other parameters set up in the system.

Maximum Number of Coupons: This is the total number of coupons that the System can create for the Ad Campaign. In an exemplary embodiment, once the number of electronic Coupons issued is equal to the Maximum Number of Coupons, the System will set the Ad Campaign Status to "Web Inactive" so no more electronic Coupons can be issued.

Campaign Creator: This is the identifier (e.g., user ID) of the person who created the Ad Campaign.

Campaign Approver: This is the identifier of the person who approved the Ad Campaign. The approver must be a Department Manager for the Ad Campaign's "Campaign Department".

Approval Date: This is the date the "Department Manager" approved the Campaign.

A Manage Campaign Budget Settings event 512 provides functionality enabling the Manufacturer's System Administrator to take into consideration all of the fees associated with campaign management when calculating the "Maximum Number of Coupons" that can be distributed before the Ad Campaign is "Web Inactivated" by the SMC System. Furthermore, the Manufacturer's System Administrator can add any fee to the system that they want to be taken into consideration when calculating the Maximum Number of Coupons. For Example the administrator can add a Retailer's Processing fee, System Processing Fee, internal cost structures, etc.

A Support Cross Product (Complex) Promotions event 514 provides an electronic template for creating a complex promotion. The event supports creating a complex multi-product, or cross product promotion. For example, if a Consumer purchases an APPLE IPOD, then they can receive 10 free down loads from ITUNES. When a Consumer requests an electronic coupon, an instance of the Ad Campaign is created with a Unique ID and placed in the Consumer's account. Some information is unique to the Coupon, and other information is obtained by referencing the Ad Campaign. This prevents duplication of information.

A Support Complex Loyalty Promotions event 516 provides an electronic template for a complex loyalty promotion. It is designed to create a complex multi-product, or cross product promotions that take into account purchase history. For example, if a Consumer purchases eleven sandwiches at a restaurant (over some specified period of time), then they can receive the twelfth one free. When a Consumer requests an electronic coupon, an instance of the electronic coupon is created from the Ad Campaign with a Unique ID and placed in the consumer account. Some information is unique to the electronic coupon (e.g., the sandwich count), and other information is obtained by referencing the Ad Campaign. This prevents duplication of information.

A View Campaign Summary Information event 518 provides a list of the Ad Campaigns for a specified view (e.g., Current Campaigns for Department 1). The summary Ad Campaign information is laid out in a spreadsheet report style format where each row represents an Ad Campaign. See, e.g., FIG. 17. Each row has summary information about a specific Ad Campaign (e.g., budget, total number of coupons issued, value of issued electronic coupons, total number and value electronic coupons redeemed, campaign expiration date, etc.). The specified values from each row are totaled and the accumulated value information is displayed at the top of the page (i.e., Summary for all Ad Campaigns).

A View Campaign Summary Statistics event 520 provides statistical information for all of the Ad Campaigns for a specified view (e.g., Current Campaigns for Department 1). This information is laid out in a general report structure, listing attributes and their associated values. By way of example, the statistical attributes comprise the following categories: Total Campaign Budget/Performance Information, Redemption Statistics, Campaign Budget/Performance Information by Consumer's ZIP Code, Redemption Statistics by Consumer's ZIP Code, and Redemption Statistics by Retailers that Redeemed the electronic Coupon. In an exemplary embodiment, the value of each attribute in the statistical report is the total of all the Ad Campaign's statistics in the specific view.

A View Statistical Forecasting event 522 provides statistical data that is used to predict performance of electronic coupons based on their performance history. This Statistical information is calculated using known statistical analysis methods.

A View Campaign Statistics event 524 provides statistical information for an Ad Campaign. This information is laid out in a general report structure, listing the attributes and their associated values. By way of example, the attributes are broken into six categories: Ad Campaign Detail Information, Total Campaign Budget/Performance Information, Redemption Statistics, Campaign Budget/Performance Information by Consumer's ZIP Code, Redemption Statistics by Consumer's ZIP Code, and Redemption Statistics by retailer that Redeemed the electronic coupon. A description of each follows:

Ad Campaign Detail Information
   Electronic Activation/Inactivation, Coupons Start/Expiration Date, Approved By/Date, Electronic Deactivation Date, etc.

Total Campaign Budget/Performance Information
   Number and Value of Coupons Budgeted, Number and Value of Coupons Issued/Redeemed/Outstanding, Percent of the Budget for Coupons Issued/Redeemed/Outstanding, etc Redemption Statistics
   Mean, Media, and Mode time for Redemption for all electronic Coupons Redeemed.

Campaign Budget/Performance Information by Consumer's ZIP Code
   Number and Value of Coupons Issued/Redeemed/Outstanding by Consumer's ZIP code, Percent of the Budget for Coupons Issued/Redeemed/Outstanding, by Consumer's ZIP code, etc Redemption Statistics by Consumer's ZIP Code
   Mean, Media, and Mode time for Redemption for all electronic Coupons Redeemed by Consumer's ZIP Code Redemption Statistics by Retailer that Redeemed the electronic Coupon
   Number and Value of Coupons Redeemed by Retailer.

An Edit, Approve, or Deactivate Ad Campaigns event 526 provides the Campaign Creator and the Campaign Manager the ability to modify the Ad Campaign, after it has been created, and before it becomes Active. In an exemplary embodiment, once the Ad Campaign becomes Active the only thing that can change is the Web Inactivation Date.

- When the Ad Campaign is created its state is set to WIP or "Work in Process."
- The Ad Campaign can be edited or deleted, any field can be modified until it has been Approved (i.e., while the Ad Campaign is in the WIP state).
- The Ad Campaign can be approved by a Campaign Manager or higher. This action sets the Ad Campaign state to "Approved", logs the Approver's ID, the Date and Time the Ad Campaign was approved, and prevents any further modifications to the Ad Campaign definition.
- Once the Date and Time of "Web Activation" occurs the SMC System will automatically set an Approved Ad Campaign to an Active state. Once the Ad Campaign is in the Active state the electronic coupon system creates associated electronic coupons from any Consumer request (e.g., via a home coupon site associated with the electronic coupons system, a manufacturer website, or other electronic Advertisement).
- Once the Date and Time of "Web Inactivation" occurs the SMC System will automatically set the Active Ad Campaign to an Inactive state at which time the electronic coupons system will stop creating associated electronic coupons for the Ad Campaign.
- The Ad Campaign can be deleted before it enters an Active (even after it has been approved) because no Consumers have been able to request and save electronic coupons associated with the Ad Campaign. However, once the Ad Campaign becomes Active, it can only be deactivated.
- The Ad Campaign can be Deactivated after it has become Active. This action can only done by a Campaign Manager or above. This action sets the Status to "Web Inactive" and prevents anyone from taking another electronic Coupon. It does not affect any of the existing electronic Coupons associated with the Ad Campaign.

A View Invoice Summary Information by Campaign event 528 provides a view, for Accountant users, of the all Coupon Invoice statuses associated with an Ad Campaign. The electronic coupons can be in any of the following states: Saved (to the Consumer Account), Redeemed (by the Retailer), Invoiced, Paid, Posted, Expired or Removed (from the Consumer's Account).

A View Invoice Summary Information by Retailer event 530 allows the Accountant users of a Manufacturer to view a summary of all of the electronic coupons and their invoice status (Redeemed, Invoiced, Paid, and Posted) accumulated according to the retailers that redeemed the coupons.

A View Invoices By Retailer event 532 allows the Accountant users of a Manufacturer to view a list of all of the Invoices, by Retailer that Redeemed the Coupons. These Invoices can be in the following status: Invoiced, Paid, and Posted.

A Pay Invoice From Retailer event 534 allows the Accountant users to pay a retailer's invoice. This event tracks the method of payment, date paid, and a confirmation number associated with the method of payment (e.g., check number). This also changes the status for each coupon that makes up the invoice to "Paid".

A Pay Invoice From Coupons Service Provider event 536 allows the Accountant users to pay an invoice from the provider of the electronic coupon service. This tracks the method of payment, date paid, and a confirmation number associated with the method of payment (e.g., check number).

A View Invoice Detail event 538 allows the Accountant users to view an invoice from a Retailer and its associated Invoice from the electronic coupon service provider. This lists all of the coupons that make up the invoice, the total number of coupons in the invoice, the total amount of the invoice, due date, invoice status, payment method, and other information.

A Print Report Pages event 540 allows a User to print any of the pages they can view.

A Manage Campaign Fees event 542 allows the Manufacturer to manage the list of campaign management fees and the value associated with these fees. The list is used to calculate the number of Coupons that can be issued based on the Campaign Budget.

Turning to FIG. 5b, a set of consumer events are identified that are associated with a Consumer (consumer account). The consumer events and the functionality invoked on Consumer servers 110a (or other servers) when they are triggered enable consumer users, through the Consumer applications 100, to create an account, search/view electronic advertisements (Ad Campaigns), and request Electronic Coupons. The set of exemplary consumer events supported by the present system are described herein below.

A View Default Consumer Screen (Home Page) event 550 provides default login pages on the Consumer applications 100 and are used to convey information about the electronic coupons system and affiliated partners.

A Provide Consumer Login Prompt event 552 initiates a logon transaction for a consumer user via the Consumer applications 100.

A Create and Edit Consumer Accounts event 554 provides a page to create a Consumer (consumer account). Each Consumer is initially established with the following identification/authentication information:

- User Name—email address
- Password
- ZIP Code: The ZIP Code is used to match the electronic coupons to the Consumer based on location. Some products/offers are not distributed nation wide. Therefore it is important to know the location of the Consumer and match it with the location of the retailer that can redeem the electronic coupon for a Manufacturer.
- List of Preferred Retailers: This is a list of the retailers that the Consumer shops. This allows the system to provide the Consumer with any of the retailer's in-store promotions. The system matches retailer's in-store promotions against the Consumer's list of preferred retailers and ZIP Code in order to present the correct set of Ad Campaigns.
- List of Preferred Shopper Card ID: This is the list of the Consumer's preferred shopper card numbers for each of the "Preferred Retailers". If the Preferred Retailer has a frequent shopper card it is captured here in order to identify this Consumer with the system at the Point of Sale (POS). Example: If the Consumer is at Kroger, and is using their Kroger's Frequent Shopper Card, the System will recognize their Kroger Frequent Shopper Card ID and retrieve their electronic coupons. If the Consumer then goes to Safeway and uses their Safeway Frequent Shopper Card, then the system will recognize their Safeway Frequent Shopper Card ID and retrieve their electronic coupons.
- Electronic Coupon System ID: This is the electronic coupon system card ID that is used in place of a Retailer's Frequent Shopper Card. Some stores that are connected to the system may not have a frequent shopper card program so the electronic coupon system Card can be used in place of a frequent shopper card.
- Phone Number: This can be used in place of a retailer's frequent shopper card or an electronic coupon system ID. This is an alternative way for the consumers to identify themselves to the electronic coupon system at a retailer's POS.

Figure 6:
FIG. 6 depicts an exemplary user interface for presenting Ad Campaigns via the electronic coupon system's internally managed site.

A View Available Coupons event 556 provides the Consumer the ability to view all of the available electronic coupons in the electronic coupon system. These electronic coupons are filtered based on the Consumer's ZIP Code and can be filtered by Manufacturer, product category, and sorted by value and expiration date. See FIG. 6 for an exemplary user interface for viewing available Ad Campaigns.

Figure 7:
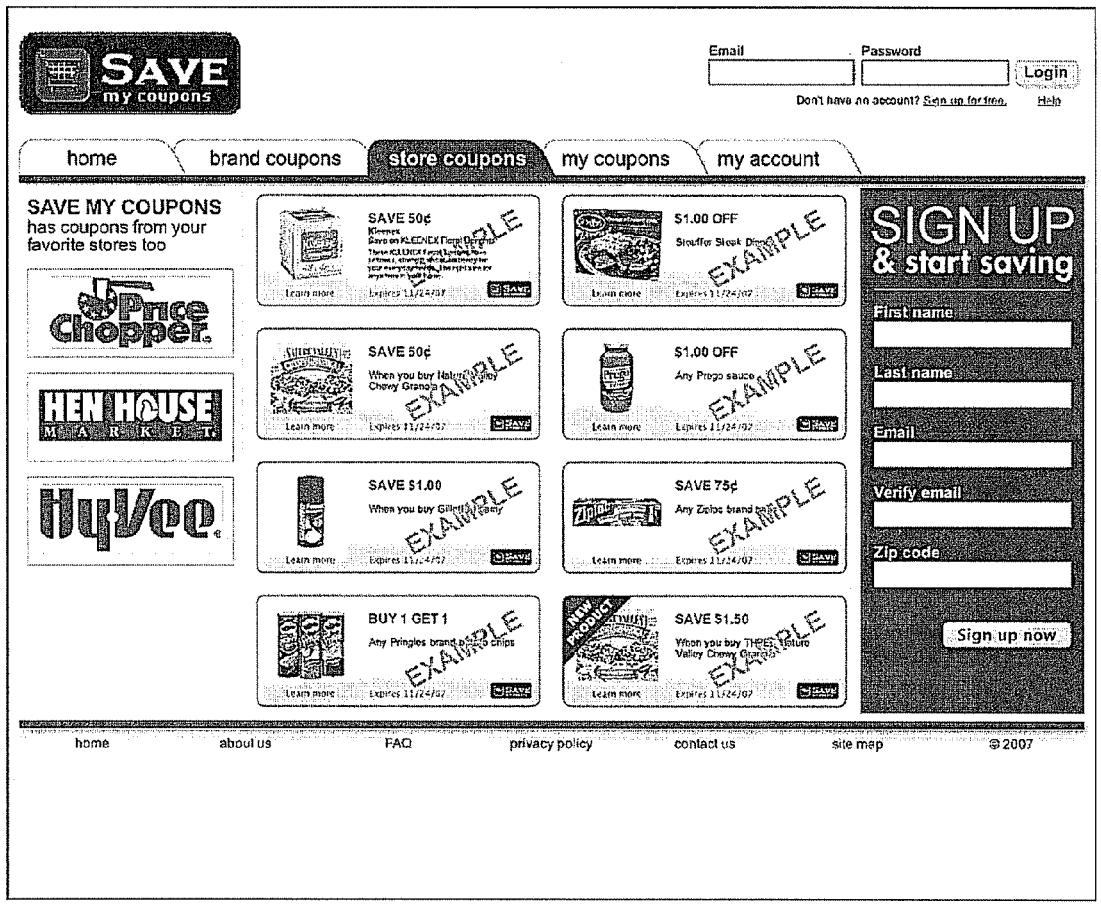
FIG. 7 depicts an exemplary user interface for presenting in-store electronic coupons.

A View In-Store Coupons event 558 provides the Consumer the ability to view all of the available retailer's electronic coupons (in-store promotions) in the electronic coupon system. These electronic coupons are filtered based on the Consumer's ZIP Code and a list of preferred retailer's. In an exemplary embodiment the in-store coupons are filtered by retailer, product category, and sorted by value and expiration date. See, FIG. 7 for an exemplary user interface for viewing available in-store Ad Campaigns.

An Add a Coupon to the Consumer's Account event 560 enables issuing an electronic coupon to a requesting Consumer. A Consumer can add an electronic coupon by a logged on user clicking on a "SaveMyCoupon" button associated with a particular Ad Campaign. The system creates an instance of the electronic coupon, and links the coupon to the Ad Campaign that it references (via the Campaign ID), the Consumer that "Saved" it (via the Consumer ID), and the Manufacturer (via the Manufacturer ID). In addition the electronic coupons log additional information such as the date and time the coupon issued.

A View Consumer's Coupons event 562 enables a Consumer to view all of the electronic coupons within the Consumer account. The electronic coupons are viewed by manufacturer, product category, and sorted by value and expiration date.

A Print a List of Coupons event 564 initiates printing a designated list of coupons issued to the consumer.

A Search Campaigns Using Shopping List event 566 provides the Consumer the ability to create a shopping list and then search all available electronic coupons for electronic coupons that meet the criteria of their shopping list.

A Provide Basic Coupon Search event 568 provides the Consumer the ability to search for electronic coupons based on a product name (e.g., TIDE).

A Provide Expanded Coupon Search event 570 provides the Consumer the ability to search for electronic coupons based on an electronic coupon category (e.g., Household Cleaners).

A Provide Search on Product Preferences event 572 provides the consumer user the ability to select a product then search all available coupons for similar coupons. For example, if a consumer selects an electronic coupon for TIDE laundry detergent, the search will display electronic coupons for CHEER and any other laundry detergents.

An Allow Banner Ad Access event 574 provides access to the electronic coupon system through external web sites and banner ads. In other words, a user can add an electronic coupon to their electronic coupon system account from another web page. This is accomplished by embedding a URL (provided by the electronic coupon system) into another web page's electronic coupon offer such that when a user clicks on the electronic coupon offer the URL sends a command to the electronic coupon system to deposit the electronic coupon into their account. The electronic coupon system will:

Check to see if the coupon requester is already logged in.
If not it will prompt the user to Log in
If the coupon requestor doe not have an electronic coupon system account, the system will prompt the coupon requestor to create an account (See, Create and Edit Consumer Accounts event 554)
Check the validity of the URL (i.e., does the URL reference an enrolled Manufacturer's Ad Campaign)
Check to make sure the Ad Campaign is still active (i.e., is the electronic coupon system still accepting requests to create electronic coupons for the Ad Campaign?)
Create an electronic coupon and put it into the coupon requestor's account An Allow Wireless Ad Access event 576 provides access to the system through PDAs and Digital Cell Phones (e.g., A coupon requester can add an electronic coupon to their account from a cell phone). This is handled much like the Allow Banner Ad Access event 574, except this information uses a WAP-like proxy server to handle the interface between the web and the wireless provider's PDA.

An Allow Internet-connected Television Access event 578 provides access to the system through selectable icons presented to users on a television (e.g., an icon on a screen presenting a product advertisement) having Internet access and remote control. This event is handled much like the Banner Ad Access event 574, except this information uses a WAP-like proxy server to handle the interface between the web and the television having Internet connectivity Turning to FIG. 5c, a set of retailer events are identified that are associated with functionality invoked on the Retailer servers 110c by the Retailer applications 104. The retailer events and their associated functionality enable retailer users to manage and monitor their internal Ad Campaigns and Manufacturer's Electronic Coupons. A Retailer is a Manufacturer, in that, a Retailer can create in-store Ad Campaigns. Therefore a Retailer has all of the same capabilities as a Manufacturer. A Retailer also has additional capabilities associated with redeeming, invoicing, and settling electronic coupons—i.e., managing electronic coupons after they have been presented by a consumer.

A Manage Authorized Users event 580 enables the setting up of a retailer account (Retailer) and retailer user accounts having specified roles associated with the retailer account. Access to the retailer's system will be determined by setting up Accounts. Roles and departments/regions determine account access by particular users. Roles determine a user's authority and the Department/Regions determine the scope of their authority. A Retailer is a type of Manufacturer, and therefore a Retailer includes all the roles of a Manufacturer.

System Administrator—primary function is to manage user accounts and system parameters.
Campaign Creators—create In-Store Ad Campaigns
Campaign Managers—is required in order to approve an in-store Ad Campaigns
Accounting Manager—can view all accounting information and pay invoices. They can also view all campaign management information, but they cannot create or approve an Ad Campaign.
Users Specific to Retailer:
Store Manager/Director—is required in order to manage redeemed electronic coupons for stores. Similar to a Manufacturer's Department Manager, a Store Manager/Director can view all summary and detail information for all of the stores for which they are responsible.
Accounting Managers—have the additional authority to post/review invoices.

A Manage Departments and Regions event 582 enable a System Administrator to use Departments/Regions to specify the scope of authority for a user of the electronic coupon system. Departments/Regions are hierarchical and can contain other Departments/Regions respectively.

Departments/Regions are assigned to users
Departments are assigned to Ad Campaigns
Regions are assigned to stores A Manage Stores event 584 provides the user the ability to add stores to a Retailer's Region for data reporting purposes.

A Manage POS (Registers) event 586 provides the user the ability to add a POS System (Register) to a Store in order to track and report electronic coupon redemptions.

A View Summary of Coupons Redeemed by Store event 588 provides a list of all of the electronic coupons redeemed for a specified view (by Company/Region) sorted by store. This information is laid out in a spreadsheet report style format where a retailer user can see the total number and the total value of all coupons redeemed, invoiced, paid and posted. Each row in the report has the same summary information about each store identified in the view. See, FIG. 8 providing an exemplary user interface associated with the View Summary of Coupons Redeemed by Store event 588.

Figure 9:
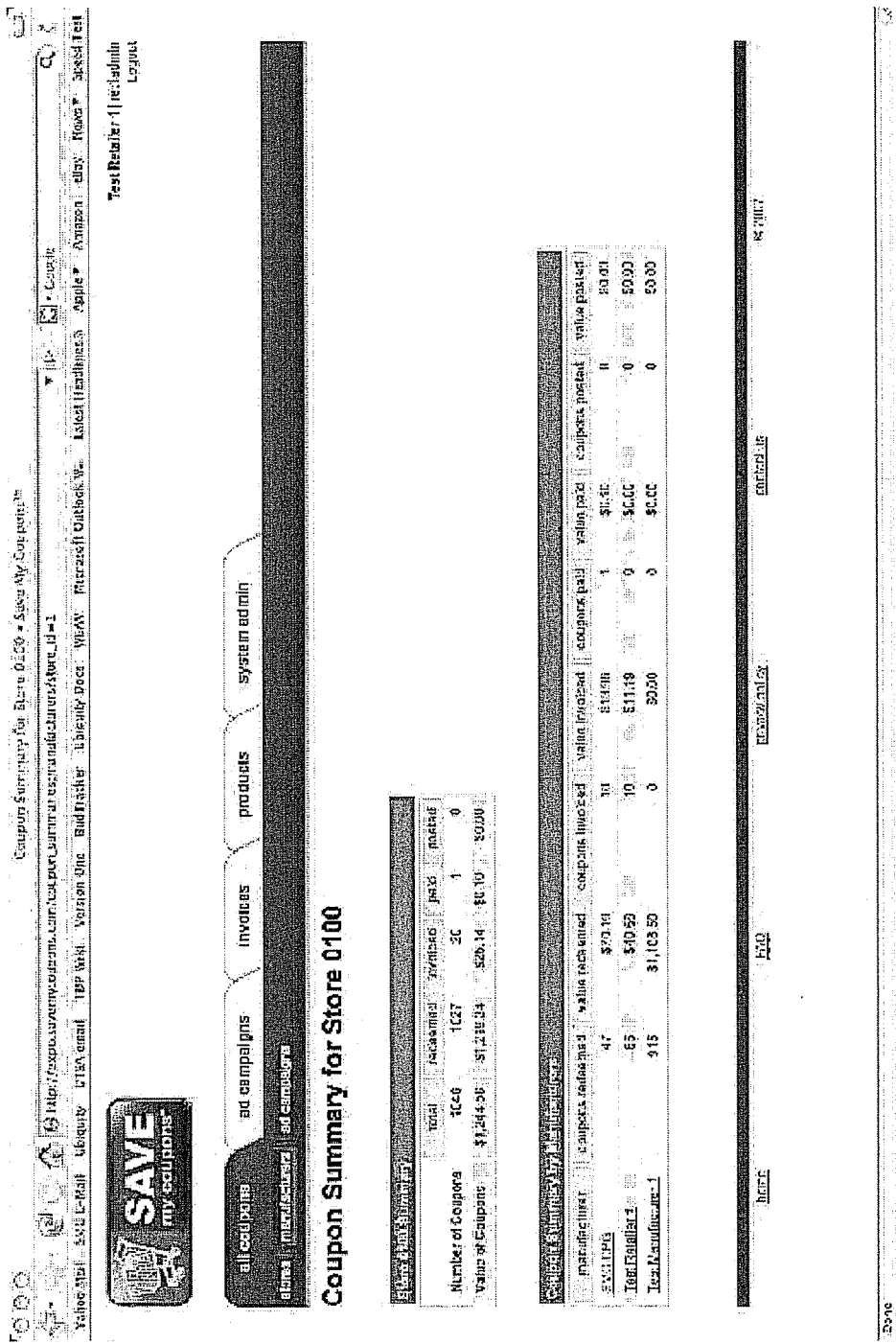
FIG. 9 depicts an exemplary user interface for presenting electronic coupon redemption information for a particular store.

A View Summary of Coupons Redeemed at a Store event 590 provides a list of all of the electronic coupons redeemed at a specified store sorted by manufacturer ID. This information is laid out in a spreadsheet report style format where a Retailer can see the total number and the total value of all coupons redeemed, invoiced, paid and posted for a specific view. Each row in the report has the same summary information about each Manufacturer in the view. See, FIG. 9 providing an exemplary user interface associated with the View Summary of Coupons Redeemed at a Store event 590.

A View Summary of All Coupons Redeemed by Manufacturer event 592 provides a list of the electronic coupons redeemed for a specified view (by Company/Region) sorted by manufacturer ID. This information is laid out in a spreadsheet report style format where a Retailer can see the total number and the total value of all electronic coupons redeemed, invoiced, paid and posted for a specific view (by Company/Region). Each row in the report has the same summary information about each Manufacturer in the view.

A View Summary of Invoices by Manufacturer event 594 provides a view, for the accountant users of a Retailer, containing a list of all of the invoices sorted by manufacturer.

A Manage Invoicing Date event 596 enables the accountant users of the Retailer to set the invoice dates (i.e., the date that invoices will be generated and issued to Manufacturers).

A Post Paid Invoices event 598 enables accountant users of the Retailer to post invoices as "Paid".

A Create In-Store Ad Campaign event 599 enables a Retailer user to create an Ad Campaign for in-store use in the same manner at the Create Ad Campaigns event 510.

Figure 5C:
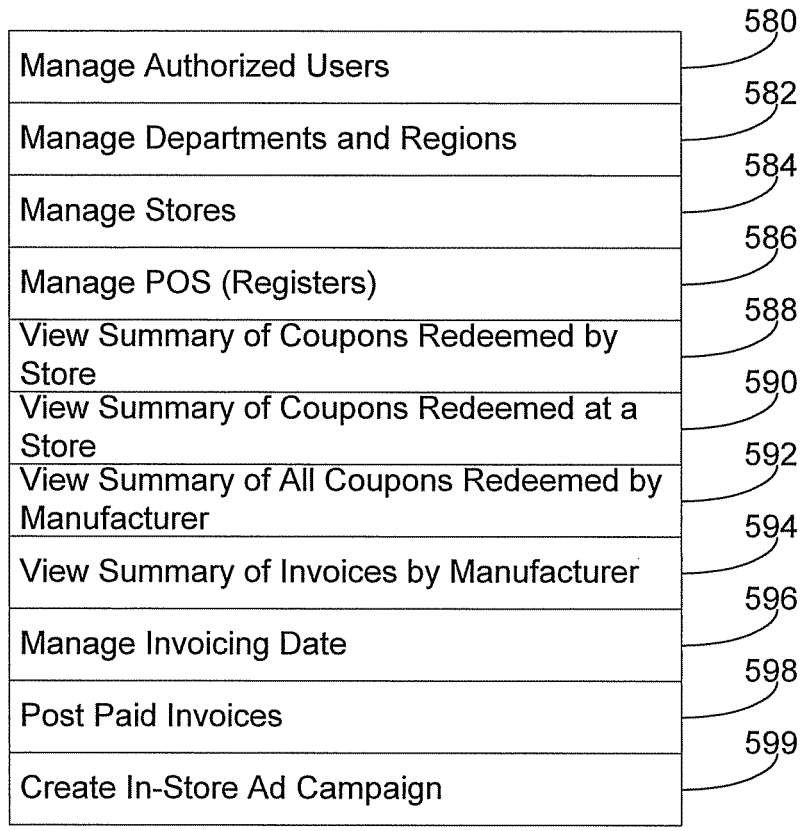
Figure 5D:
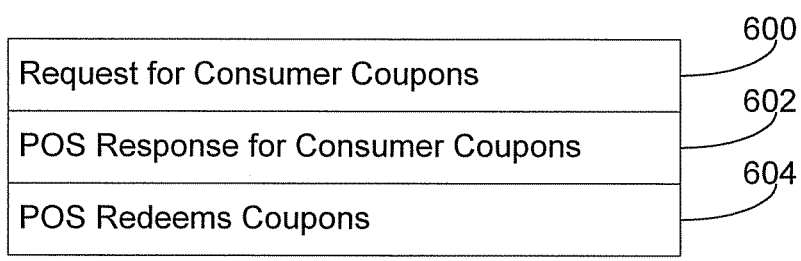

Turning to FIG. 5*d*, a set of events are identified that are invoked by the Retail POS applications 106 on the Retailer POS servers 110*d* during a checkout operation of a consumer having a consumer account on the electronic coupon system. The Retailer POS events support the functional interface between the Retailer POS servers 110*d* of the electronic coupon system and the Retailer POS applications 106 operating at retailer's checkout counters. The Retailer POS applications 106 validate retrieved electronic coupons for an identified Consumer against a set of purchases registered at the checkout counter's POS system. The Retailer POS applications 106 initiate sending back information about any qualifying redemptions of the retrieved electronic coupons for the purpose of updating the appropriate electronic coupon system records maintained by the database servers 120 that facilitates tracking and reporting coupon redemption information and invoicing the Manufacturer for the electronic coupons that have been redeemed during the checkout process.

The Retailer POS applications 106 identify the Consumer (via a frequent shopper card, etc.) and send a request for the Consumer's electronic coupons to the Retailer POS servers 110*d*. The Retailer POS servers 104 submit appropriate queries to the database servers 120 for retrieval of the Consumer's electronic coupons. The Retailer POS servers 110*d* forward the Consumer's retrieved electronic coupons (provided by the database servers 120) to the requesting one of the Retailer POS applications 106. It is envisioned that in embodiments of the electronic coupon system, only a portion of the Consumer's total set of electronic coupons are provided by the electronic coupon system in response to a request from one of the Retailer POS applications 106 based upon a filtering criterion (e.g., the type of store, the store ID, a set of categories provided by the POS application, etc.). For example, in-store electronic coupons are only applicable to their particular identified retail establishment. In other embodiments all the valid (unexpired) electronic coupons for the identified Consumer are provided to the requesting one of the Retail POS applications 106. The POS application: (1) applies the complete UPCs and any other qualifying requirements (e.g., purchase quantity) of the set of retrieved coupons to the UPCs of the purchases registered at the POS device, and (2) credits the consumer according to the specified coupon value. If any of the electronic coupons are accepted and redeemed by the Retailer POS application, then the Retail POS application sends a redemption notification message to the Retailer POS servers 110*d* along with detailed information about the transaction.

Turning to the particular supported POS events, a Request for Consumer Coupons event 600 enables the Retailer POS applications 106 request the Retailer POS servers 110*d* to provide identified Consumers' electronic coupon lists. In an exemplary embodiment, the Retailer POS servers 110*d* receive XML formatted requests from the Retailer POS applications 106 over a Secure Sockets Layer using the Internet. An exemplary XML request contains the following:

ID-Type: the type of Consumer Identifier (e.g., Electronic coupon system ID, Phone Number, Retail Frequent Shopper ID, etc).

Consumer-ID: the unique Consumer Identifier associated with the ID-Type.

Retailer-ID: identifies the Retailer that is sending the request.

A POS Response for Consumer Coupons event 602 provides the Retailer POS applications 106 to receive a request for the Consumer's Electronic Coupons. The following information is returned by the Retailer POS servers 110*d* in response to the Consumer electronic coupon requests from the Retailer POS applications 106:

ID-Type: the type of Consumer Identifier. It is typically the unique identifier associated with the service (e.g., Electronic coupon system). It sets the primary Consumer Identifier for the follow-on transactions.

Consumer-ID: the unique Consumer Identifier associated with the ID-Type

Consumer Information: a list of information about the identified consumer account that can be presented to the purchaser associated with the identified consumer account. It can contain the consumer name, consumer historical savings total, the number of electronic coupons in the identified consumer's account, and anything else that a POS system might present to a customer during/after the checkout process.

List of Coupons: a list of electronic coupon descriptions/records. Each electronic coupon description in the list contains the following information:
   Electronic Coupon-ID: a unique identifier for the electronic coupon. This is required to track the status of the coupon as it transitions through the system.
   Manufacturer ID: a unique identifier of the company that is responsible for the electronic coupon. In an exemplary embodiment, the system treats the identified manufacturer as the party responsible for paying for the redemption value and any associated costs for a redeemed coupon.
   Type: type of electronic coupon (e.g., simple, complex, loyalty).
   UPC List: list of UPCs associated with the electronic Coupon. The UPCs are compared to the UPCs registered during a customer's check out. In an exemplary embodiment, each entry in the UPCs listed for an electronic coupon consist of the following information:
      UPC (Universal Product Code)
      Check digit
   Value: defines the reward structure to the POS applications 106.
      Type: communicates the type of the reward (e.g., fixed or percent off)
      Amount: the reward amount (e.g., $0.50, or 10%)
      Display: used to display information to the Consumer during the transaction A POS Redeems Coupons event 604 enables Retail POS applications 106 to inform the Retail POS servers 110d that a coupon has been redeemed and initiate a series of update and accounting processes carried out by the Retail POS servers 110d and the database server 120. The following information is sent from the POS Applications 106 to the servers in order for the electronic Coupon's status to be set to "Redeemed":
   ID-Type: This is the type of Consumer Identifier (e.g., SaveMyCoupons ID, Phone Number, Retail Frequent Shopper ID, etc)
   Consumer-ID: This is the unique Consumer Identifier associated with the ID Type.
   Retailer ID—This is the unique identifier for the Retailer
   Store ID—This is the unique identifier for the Retailer's Store
   Register ID—This is the unique identifier for the Store's POS System
   Operator ID—This is the employee identifier operating the POS System
   Transaction ID—This is a unique identifier for the transaction
   Time Stamp—This is the date and time stamp of the transactions
   Coupons Redeemed—This is a list of electronic Coupons Redeemed during the transactions. Each electronic Coupon Redeemed has the following information:
      Coupon ID—This is the unique electronic Coupons ID that was received from the Server, and redeemed by the POS System.
      List of UPC—This is a list of the Universal Product Codes that were used to validate the electronic Coupon for redemption:
         Code
         Check Digit
      Redemption Value: This is the actual value of the reward. It is used in order to communicate to the Server the actual value of the electronic Coupon when it is redeemed. Example: if the electronic Coupon is "buy one get one free" then the POS System returns the value of the free item rewarded.

Turning to FIG. 5e, a set of electronic coupon system events are identified. The electronic coupon system events are designed to support, manage and monitor all of the enrolled/defined user entities of the electronic coupon system (e.g., Manufacturers, Consumers, Retailers and Retailer POS). Additionally the electronic coupon system events schedule housekeeping activities required to keep the electronic coupon system up to date and synchronized. In the description of an exemplary embodiment that follows, the events are grouped in three categories: Administrative System Management, Event Scheduling, and External Device Management.

Administrative System Management Events:

A Manage Manufacturer Accounts event 610 enables an electronic coupon system System Administrator to create a manufacturer account (Manufacturer) and pre-populates the Manufacturer with standard default data (e.g., postal ZIP codes, Product Groups, Product Categories, etc.), and profile information.

A Manage Retailer Accounts event 612 enables an electronic coupon system System Administrator to create a retailer account (Retailer) and pre-populate the Retailer with standard default data (e.g., postal ZIP codes, Product Groups, Product Categories, Regions, etc.), and profile information.

A View Manufacturer's Data event 614 enables the electronic coupon system System Administrator to view all of the information that the Manufacturer users can view.

A View Retailer's Data event 616 enables the electronic coupon system System Administrator to view all of the information that the Retailer users can view.

A View Consumer Data event 618 enables the electronic coupon system System Administrator to view all of the information about a Consumer that the Consumer users can view.

A Manage Coupon Value Codes event 620 enables the electronic coupon system System Administrator to add and manage all of the electronic coupon value codes needed to communicate discount information to the Retailer POS applications 106.

A Manage Product Categories event 622 enables the electronic coupon system System Administrator to add and manage all of the Product Categories used to categorize the Ad Campaigns in the electronic coupon system.

A Manage Coupon Invoice event 624 enables the electronic coupon system System Administrator to manage invoices in the same manner as a Retailer user can manage the retailer's invoices.

A Manage Batch Jobs event 626 enables the electronic coupon system System Administrator to manage and schedule batch jobs (listed as separate events described herein below).

Event Scheduling (Batch Jobs) Events:

An Email Notifications event 628 enables the electronic coupon system to automatically email a Consumer user when their electronic coupons are about to expire, or according to any other defined criterion such as: a follow-up supplemental marketing message based upon the perceived interest of the Consumer in previously selecting an electronic coupon. Thus, the Email Notifications event 628 provides a focused supplemental/follow-up marketing tool for Manufacturers.

A Manage Coupon Expiration event 630 enables the electronic coupon system to automatically copy/move expired electronic coupons from Consumers' active electronic coupon lists to a coupon archive, and change the electronic coupon's state form "Saved" to "Expired".

An Invoice Coupons event 632 enables the electronic coupon system to automatically run a batch job that creates and rates invoices (i.e., calculate the amount due) for Retailers and the electronic coupon system service provider. If an invoice has been scheduled by a Retailer, then the system will:

Search for the electronic coupons which have been redeemed by the Retailer (electronic Coupons with Status "Redeemed")

Create a Retailer's Invoice for each of the Unique Manufacturer IDs associated with the electronic coupons Create an invoice for each of the Retailer's invoices, assign an invoice number to the Retailer's invoice, and visa versa. (i.e., tie the invoices together)

Assign the electronic coupon to the Retailer's invoice

Set the electronic coupon's state to "Invoiced" (from "Redeemed")

Rate Retailer's Invoice (see, Rate Invoice for Retailer event 634)

Rate SMC's Invoice (see, Rate Invoice for Electronic Coupon Service event 636)

A Rate Invoice for Retailer event 634 enables the electronic coupon system to automatically rate a Retailer's invoices based on terms of a manufacturer/retailer contract. The system will:

Count the number of electronic coupons in the invoice, and

Total the face value of the electronic coupons

A Rate Invoice for Electronic Coupon Service event 636 enables the electronic coupon system to automatically rate electronic coupon system service invoices based on terms of a Manufacturer/Service provider contract. The system will:

Count the number of electronic coupons and

Charge the Manufacturer based on the number of electronic coupons redeemed.

A "Web Inactivate" Ad Campaigns event 638 enables the electronic coupon system to automatically set the status of an Ad Campaign to "Inactive" for all Ad Campaigns that have reached their Web Inactivation Date.

External Device Management:

A Manage POS Interfaces event 640 enables the electronic coupon system to configure and monitor the Retailer POS applications 106.

A Manage System Resources event 642 enables the electronic coupon system to optimize performance of primary and secondary storage, memory, communication bandwidth, and CPU utilization, etc.

As noted previously herein above with reference to FIG. 4r, an "Ad Campaign" defines a template for a rule-based promotion (from which electronic coupons are issued to Consumers). The Ad Campaign structure provides the system with general information about an advertisement campaign (like the promotion details, distribution area, validation dates, etc), which is used by everything in or connected to the system (e.g., users, electronic Coupons, POS Systems, search engines, external web sites, web browsers, etc). In addition, an Ad Campaign structure is associated with status parameters that specify which, of a set of states, the Ad Campaign presently occupies. In and exemplary embodiment, Ad Campaigns can occupy the following states: Work in progress (WIP) 700, Approved 702, Active 704, Inactive 706, and Expired 708. Each of these states, and the transitions between them, are described herein below with reference to FIG. 10.

Figure 10:
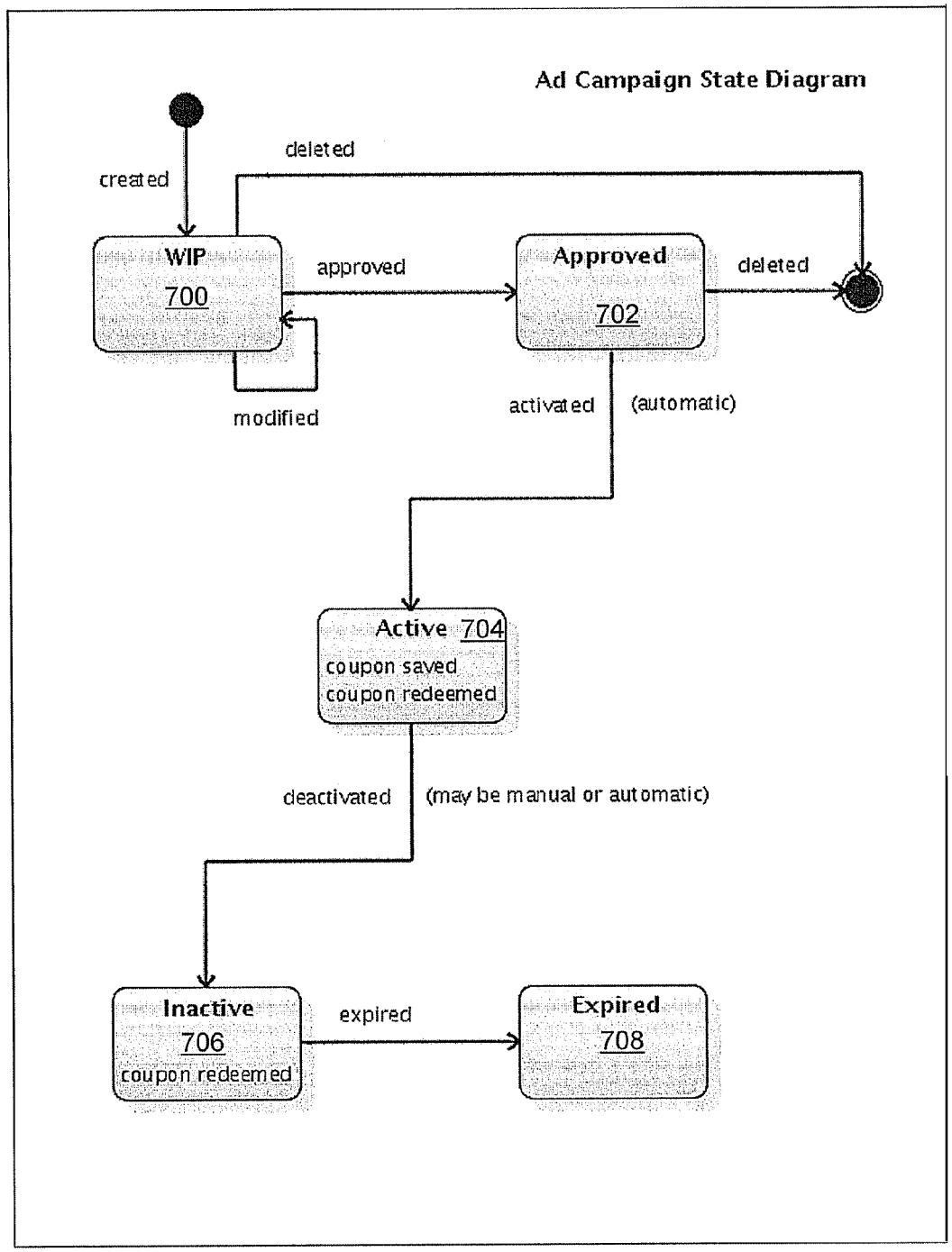
FIG. 10 identifies a set of states and transitions for an Ad Campaign.

Turning to FIG. 10, an exemplary Ad Campaign state diagram depicts each of the above-identified states and associated transitions. An Ad Campaign initially occupies the WIP state 700 when it is initially created and its parameters have not yet been fully defined (or approved). In an exemplary embodiment, the Ad Campaign can be edited or deleted, and any field can be modified only while in the WIP state 700.

Upon approval by a user having a manager role (or another entity having greater privileges than a manager), the Ad Campaign transitions to the Approved state 702 and the ability to edit the Ad Campaign ceases. However, it can still be deleted. The Approver's ID and the Date and Time of approval are written to the appropriate fields the Ad Campaign record.

In an exemplary embodiment, once specified date and time for "Web Activation" passes, the electronic coupon system automatically transitions the Approved Ad Campaign to the Active state 704. While in the Active state 704, the Ad Campaign is available for publication to Consumers and electronic coupons can be issued to Consumers in response to their requests and according to the guidelines specified by the Ad Campaign. Once activated, the Ad Campaign cannot be deleted.

Thereafter, when the Ad Campaign's specified "Web Inactivation" date and time is reached, the electronic coupon system causes the Ad Campaign to enter the Inactive state 706. While in the Inactive state 706, electronic coupons cannot be issued from the Ad Campaign. The act of setting an Ad Campaign's Web Inactive parameter so that it enters an Inactive state can be carried out either automatically or manually and can occur for a number of reasons including: expiration of the originally specified time and date, meeting a limit in issued electronic coupons, detection of an error or fraud, etc. Deactivation, in an exemplary embodiment, can be manually initiated only by a Campaign Manager (or higher priority role in a Manufacture). Deactivation of an Ad Campaign, which causes a transition to the Inactive state 706, prevents issuance of additional electronic coupons. It does not affect existing electronic coupons associated with the Ad Campaign.

The system transitions from the Inactive state 706 to the Expired state 708 in response to formal recognition by the system housekeeping batch processes that the Web Inactivation date has passed for the Ad Campaign.

As noted previously herein above with reference to FIG. 4s, an "electronic coupon" structure defines an instance of an electronic coupon generated, upon request from a Consumer, from an Ad Campaign defined according to the fields identified in FIG. 4r. The electronic coupon instance's data structure contains fields that facilitate specifying detailed information associated with a set of states defining a lifetime of an electronic coupon. In addition, an electronic coupon structure is associated with status parameters that specify which, of a set of states, the electronic coupon presently occupies. In and exemplary embodiment, electronic coupons can occupy the following states: Saved 800, Redeemed 802, Invoiced 804, Paid 806, Posted 808, Expired 810, and Removed 812. Each of these states, and the transitions between them, are described herein below with reference to FIG. 11.

Figure 11:
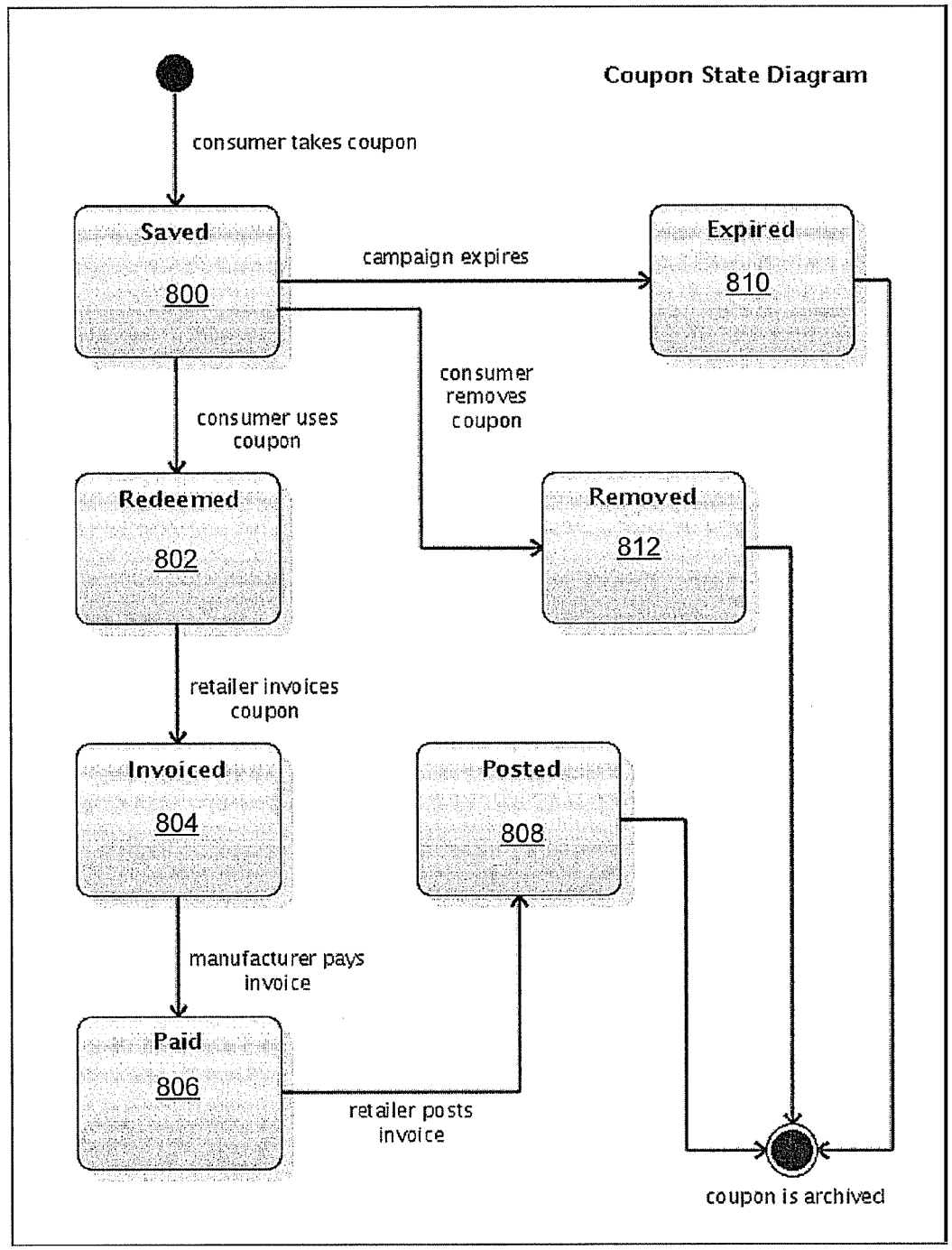
FIG. 11 identifies a set of states and transitions for an electronic coupon.

Turning to FIG. 11, an exemplary electronic coupon state diagram depicts the above-identified states and associated transitions. An electronic coupon initially occupies the Saved state 800 when it is initially created from an active Ad Campaign and stored in a consumer account (Consumer). A saved electronic coupon has a variety of information including, among other things, a link to the Ad Campaign from which it was issued to the Consumer. A saved coupon is stored in a consumer's list of electronic coupons and can be recalled for display along with the other saved electronic coupons issued to the Consumer.

The electronic coupon transitions from the Saved state 800 to the Redeemed state 802 in association with a redemption event (described herein above with reference to FIG. 5d) carried out through interactions between one of the Retail POS applications 106 and the Retail POS servers 110d during a purchase transaction by a user associated with the Consumer to which the previously saved coupon previously issued. The electronic coupon resides in the Redeemed state 802 awaiting invoice processing by the electronic coupon system.

The electronic coupon transitions from the Redeemed state 802 to the Invoiced state 804 in response to an invoice processing event (described herein above with reference to FIG. 5e). In the exemplary embodiment, the invoicing of coupons is carried out on a scheduled basis as a batch process that creates and issues invoices based upon a set of coupons that presently reside in the Redeemed state 802.

In an exemplary embodiment, the electronic coupon resides in the Invoiced state 804 until a responsible party (the Manufacturer) has paid the invoice with which the invoiced coupon is associated to the retailer. In response to an invoice payment event (described herein with reference to FIG. 5a), the electronic coupon transitions from the Invoiced state 804 to the Paid state 806.

By way of example, the electronic coupon resides in the Paid state 806 until the Retailer associated with the redemption event has acknowledged receipt of the payment from the manufacture. Thus, in the exemplary embodiment, in response to an invoice posting event (described herein with reference to FIG. 5c) initiated by one of the Retailer applications 104, the electronic coupon transitions from the Paid state 806 to the Posted state 808. Thereafter, at some later time of variable duration, the electronic coupon is archived in its final state—in this case the Posted state 808.

The above state transitions describe the normal course of a redeemed coupon. However, if the coupon expired (due to passage of time beyond the electronic coupon's specified expiration date). In response to a manage coupon expiration event (described herein with reference to FIG. 5e), the expired electronic coupon transitions from the Saved state 800 to the Expired state 810. The system archives the expired electronic coupon from the Expired state 810.

Alternatively, a user associated with the Consumer, to which the electronic coupon has been saved, can remove the electronic coupon in the Saved State 800. In response to a request to delete a previously saved coupon, the system marks the electronic coupon as "removed" and the electronic coupon transitions from the Saved state 800 to the Removed state 812 from which the electronic coupon is thereafter archived.

Figure 12:
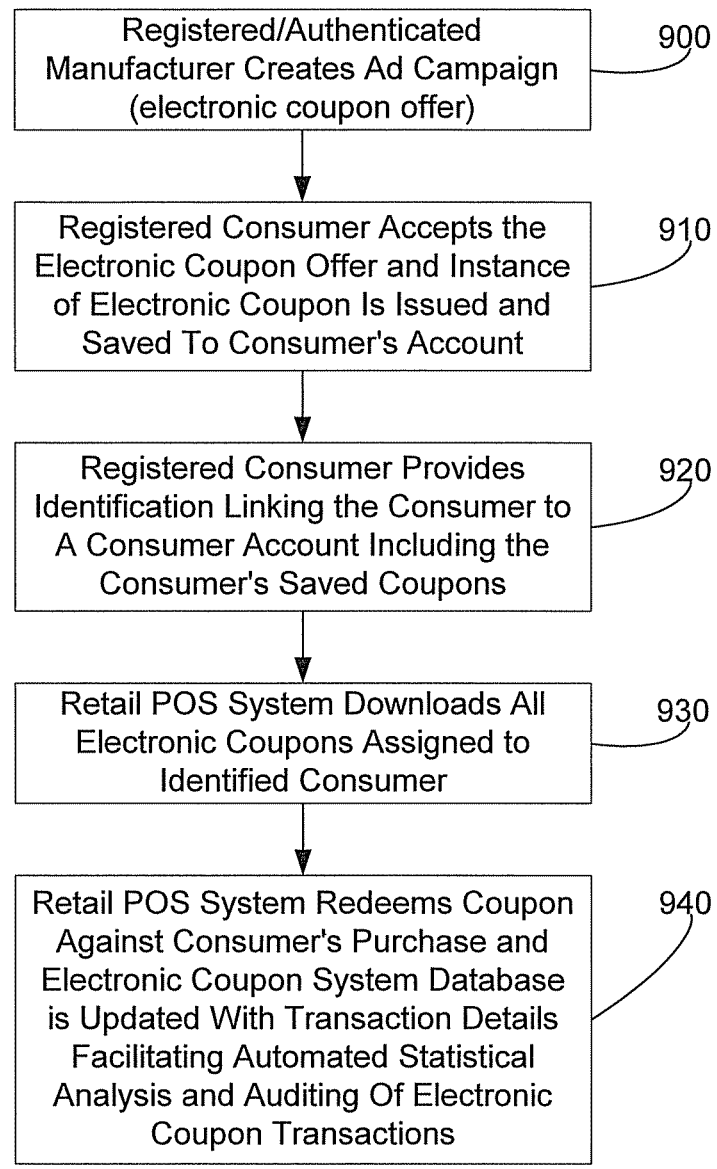
FIG. 12 is a flowchart summarizing a set of steps for the general operation of the system.

Turning to FIG. 12, the following summarizes the general operation of the system. Initially, a manufacturer subscribes to the electronic coupon system service and is assigned a unique identifier. Thereafter, the manufacturer creates an electronic coupon offer during step 900. By way of example, the electronic coupon offer is an object template that defines the coupon offer, but lacks a specific consumer ID and coupon ID. Electronic coupon offers can be presented in a variety of ways. In cases where an electronic coupon offer resides outside the electronic coupon system, an embedded link is provided to the electronic coupon system service within any form of their on-line marketing modes (e.g., Web ads, emails, etc.). For example, a manufacturer (or an agent of the manufacturer) adds the link in the form of a branded service (e.g., SaveMyCoupons) button within an advertisement window. Thus supported delivery modes include: e-mail, banner page ads, corporate websites, PDAs, and/or ads on digital TV.

A consumer subscribes to the electronic coupon system by filling out an electronic subscription form. In response, the user receives a unique consumer account ID. During step 910, when the consumer is presented a link embedded in an advertisement/offer presented via one of the aforementioned delivery modes, the consumer clicks on the link/button. Selecting the link initiates a request to the electronic coupon service servers to create an electronic coupon object (containing a unique coupon instance ID) associated with the consumer (consumer account ID) and selected link. A reference to the electronic coupon (depicted in FIG. 2 by an arrow from a consumer instance to the electronic coupon object) is added to an appropriate consumer account object. The electronic coupon system also stores a reference to the newly created electronic coupon record in the account of an associated manufacturer (depicted in FIG. 2 by an arrow from a manufacturer instance to the electronic coupon object).

Thereafter, the consumer goes to a retailer that subscribes to the electronic coupon system and purchases a product that corresponds to the electronic coupon object created during step 910. During the checkout process, during step 920 the consumer provides an identification linking the consumer to an electronic coupon (Consumer) account containing the electronic coupon generated during step 910. This can be done by presenting the retail POS system with the retailer's loyalty program card, an electronic coupon system ID card, a phone number, mobile phone, biometrics like fingerprints or iris images, Social Security Account Number, or any other identification method that was setup in the consumer's account as a valid identification source.

During the checkout process, the retailer POS device accesses the consumer's saved electronic coupon corresponding to a purchased product. In an exemplary embodiment the association between an electronic coupon and a purchased product is achieved at any desired level of particularity. For example, in an exemplary embodiment one or more UPC codes are associated with an electronic coupon to specify a particular product brand, name and size range to which the electronic coupon corresponds. During the redemption stage, one of the Retailer POS applications 106 interacts with the electronic coupon system servers to acquire the relevant electronic coupon object information and execute a transaction registering the electronic coupon redemption event (identifying the UPC of the purchased product, the retailer, the date/time, etc.).

In a particular embodiment, during step 930, after the consumer presents an identification to the retail POS system, the POS system acquires a complete listing of all electronic coupon objects associated with the identified consumer account. The retail POS system validates the consumer's purchases against the list of electronic coupons retrieved from the database server 120. During step 940 the electronic coupon created during step 910 is matched to a product purchased by the consumer, then a redemption event is triggered wherein the previously issued electronic coupon object is modified to include information associated with the redemption event including identification of the purchased product (by UPC), the retailer POS, and the time of redemption. The updated information is provided in the form of a redemption notification transaction to one of the Retail POS servers 110d to update the affected database object list entries (consumers, manufacturers, and retailers) as well as the electronic coupon object.

Thus, in response to the redemption notification, the electronic coupon system marks the electronic coupon object as redeemed, timestamps the object, and adds a reference to the redeemed electronic coupon in a list of redeemed electronic coupons associated with the retailer POS object corresponding to the place where the checkout event occurred. The system also records information about the retailer that redeemed the electronic coupon and the transaction in the electronic coupon. The information creates an electronically auditable trail that supports invoicing the manufacturer for the electronic coupon on behalf of the retailer (Retailer ID, Store ID, Register ID, Date and Time of Redemption, and Redemption Value, Products Purchased, etc).

Having described the architecture and general operation (including exemplary user interfaces) of an exemplary electronic coupons system, attention is directed to several particular operations/functions supported by the above-described system summarized in a series of flowcharts and associated written description. The operations described herein below exemplify the flexible/extensible nature and breadth of supportable features of the above-described system infrastructure and supported base functionality.

Fraud Prevention:

Fraud, by both consumers and retailers, substantially reduces the value and viability of marketing products and services via coupons. Fraud associated with the redemption of coupons is addressed, in an extension of the basic functionality of the electronic coupon system, through real time tracking and authentication of transactions involving electronic coupons. The set of steps summarized in FIG. 13 and described herein below, addresses fraud though the tracking and authentication of electronic coupons via real time monitoring of electronic coupon transactions.

Figure 13:
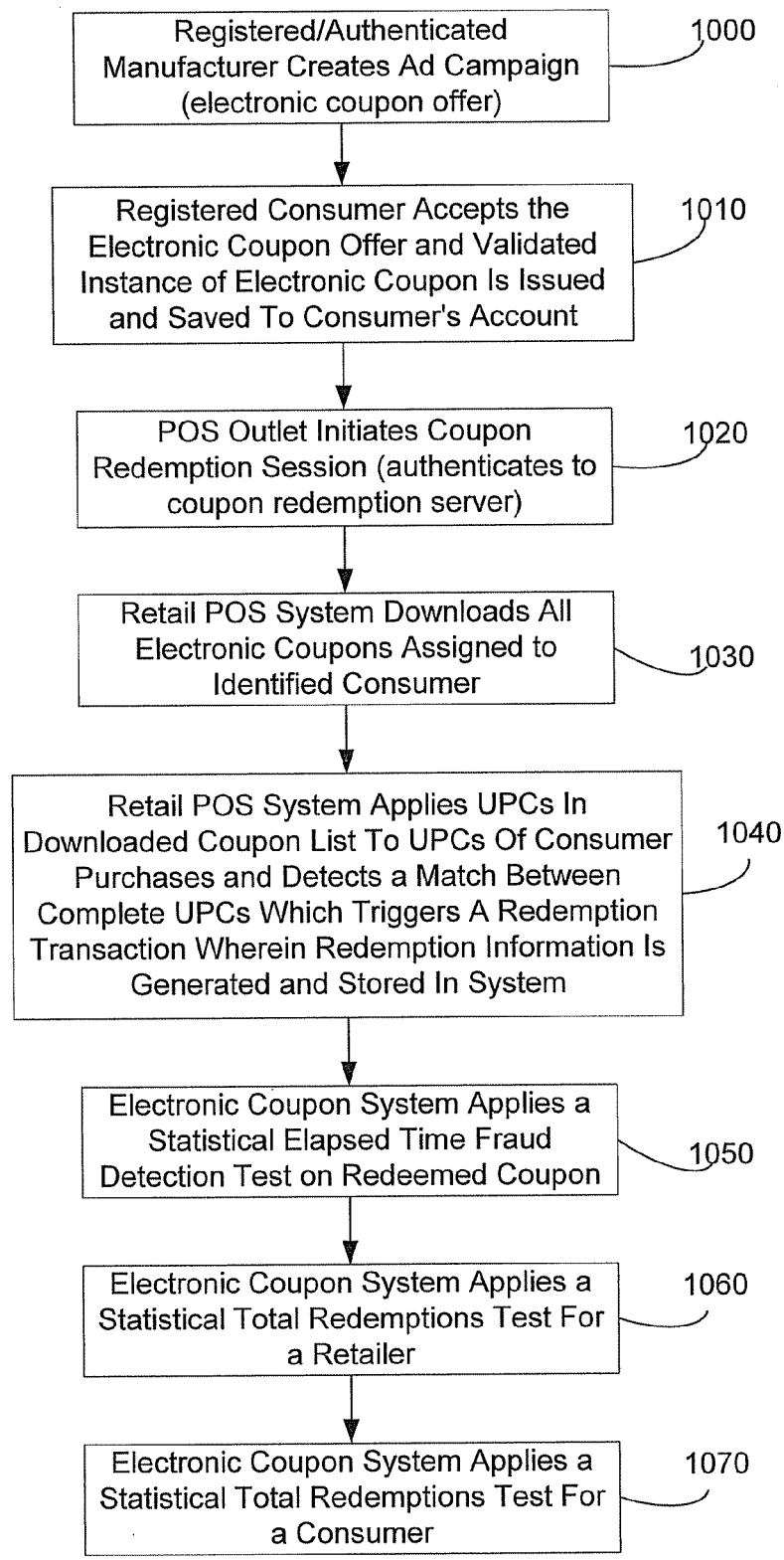
FIG. 13 is a flowchart summarizing a set of steps for addressing coupon redemption fraud.

Referring to FIG. 13, during step 1000, an Ad Campaign is defined under a particular Manufacturer (account) by an authenticated user (via standard logon ID/password function). In the particular example, the manufacturer server 110b authenticates a logged on user for a particular manufacturer by comparing supplied credentials against one or more values maintained in the "companies_id" field of a corresponding record in a Companies table (see, FIG. 4a, Companies table record 300). Thereafter, the authenticated user defines an Ad Campaign structure including a definition for a particular electronic coupon (see, FIG. 4r, Ad Campaign table record 470), and the newly defined Ad Campaign is added to the table of Ad Campaign records maintained by the database server 120. The new Ad Campaign record, specifying a set of parameter values defining a new electronic coupon/offer, is identified by a unique integer value assigned to the "ad_campaign_id" field of the new record.

Thereafter, during step 1010, an electronic coupon instance (see, FIG. 4s, Coupons table record 480) is created for a particular authenticated Consumer. In particular, during step 1010 a logged on Consumer (via one of the consumer applications 100) having a unique consumer ID (see, FIG. 4u, Consumers table record 500, consumers_id) selects a displayed electronic coupon offer corresponding to the Ad Campaign (electronic coupon) defined and saved during step 1000. In the illustrative example, the Ad Campaign is displayed on a website supported by Consumer servers 110a and the database servers 120. However, a wide variety of channels are contemplated for the presentation of electronic coupon offers including via links to electronic coupon offers embedded onto virtually any type of Web page.

During step 1010, in response to the received request from the authenticated Consumer, the consumer server 110a validates a unique Ad Campaign ID associated with the requested electronic coupon for the selected Ad Campaign. The server 110a validates the consumer request's time and date (to ensure the offer period has begun and has not expired) by reference to the web_activation_date and web_deactivation_date fields of the selected Ad Campaign/electronic coupon. Upon validation, the consumer server 110a creates a unique electronic coupon record (see, FIG. 4s, Coupons table record 480) having a unique coupon_id value (in regard to the particular Ad Campaign from which the electronic coupon was created). The electronic coupon specifies the unique consumer_id value associated with the requesting authenticated consumer. The new electronic coupon is deposited into a list of electronic coupons associated with the Consumer's account (identified by a unique consumer_id value).

It is noted that a single electronic coupon is potentially associated with multiple UPC codes. Therefore, in the exemplary embodiment, the Ad Campaign record (and thus any coupon instance created from the Ad Campaign record) includes a "product_group_id" field containing a value (e.g., an integer) referencing one or more records stored in a Product-UPC Mappings table (see FIG. 4k) that map the product_group_id value to one or more UPC values.

Thereafter, a user redeems the electronic coupon at a retailer POS outlet. During step 1020, the retailer POS outlet initiates a coupon redemption session with the POS server 110d. During checkout at the retailer POS outlet, the POS server 110d validates retailer POS identification information against company, store, and POS outlet records maintained by the database servers. The identification information includes, by way of example, IDs corresponding to the retailer ID (see, companies_id of Companies table record 300), the store ID (see, stores_id of Stores table record 370), and the POS ID (see, POS table record 380, point_of_sales_id). The supplied combination of retailer ID, store ID and POS ID must be valid to constitute a valid combination to enable a coupon redemption transaction to occur.

During step 1030, the retailer POS server 110d retrieves a set of electronic coupons associated with the user's Consumer account associated with a Consumer ID presented at the retailer POS (e.g., a loyalty card id, a phone number, etc.). The downloading is initiated as soon as possible after presentation of a Consumer ID at the retailer POS outlet. In accordance with an illustrative embodiment, electronic coupons are pre-filtered prior to downloading to a requesting retailer POS by the server 110d. In the particular instance of the electronic coupon created during step 1010, the server 110d verifies that the retailer POS site is within a region where the coupon is active by comparing the zip code (see, region_id in the Stores table record 370) associated with the store containing the retailer POS to the ad campaign area (see, campaign_area_id of Ad Campaign table record 470 which in-turn references a Campaign-area mappings table record 450 which, in turn, references a Postal Codes table record 460). The retailer POS server 110d will not download any coupon where the current retailer POS is not located with an area (a set of zip codes) designated by the electronic coupon. Any other appropriate electronic coupon pre-screenings can occur as well based upon identification information supplied by the retailer POS application 106 for either/both the currently authenticated retailer POS or Consumer. More advanced pre-filtering algorithms can apply a throttle to the number or frequency of electronic coupons a particular user redeems for a particular ad campaign (enforce a total or frequency limit). Thus, during step 1030 the POS server 110d operates as a pre-screening electronic coupon filter for electronic coupons contained in the list of electronic coupons associated with the authenticated Consumer (account). Upon completion of step 1030 a set of filtered electronic coupons has been provided by the retailer POS server 110d to the requesting one of the retailer POS applications 106.

Next, during step 1040, the retailer POS application that received the electronic coupon list (during step 1030), applies the electronic coupon list to the purchases registered at the retailer POS outlet. In accordance with the exemplary embodiment, when the retailer POS registers the purchase of a product (identified by a particular UPC), the retailer POS application compares the UPC to the set of UPCs associated with the set of electronic coupons downloaded during step 1030, including one or more UPCs referenced by the electronic coupon issued by the Consumer server 110a to the Consumer during step 1010.

In the illustrative example, during step 1040 a match is detected between a UPC for a purchased product and a UPC associated with the electronic coupon issued to the Consumer during step 1010 (see, product_group_id in Ad Campaign record 470 and Product-UPC Mappings record 400). In response to the identification of a match, the retailer POS application captures/extracts a set of identification information associated with the transaction to create a unique electronic coupon redemption transaction record (see, Coupons Table record 480) including: the coupons_id, consumer_id, retailer_id, purchased_product, redemption_value, consumer_id, point_of_sale_id, clerk_id, pos_transaction_id, date, and time stamp.

In accordance with an exemplary embodiment, the automatic storage/tabling of a variety of identification and time stamp information associated with issuance and redemption of electronic coupons facilitates end-to-end monitoring of electronic coupons from creation to redemption. Thus, in an exemplary embodiment, after redemption of the electronic coupon (issued during step 1010), a series of fraud detection/prevention steps are performed based upon a variety of transactional data associated with the creation and redemption of electronic coupons. The fraud detection/prevention operations can be followed by any of a variety of remedial steps including: refusing to apply the coupon, refusing to reimburse the retailer, de-authorizing the retailer, etc. In the exemplary embodiments described herein, a time period is used to identify abnormal redemption patterns. In other instances, abnormal redemption patterns are based upon percentages of total products sold that are accompanied by a redeemed coupon. Furthermore, fraudulent behavior can be determined with greater certainty by comparing a set of abnormal redemptions against the redemption patterns at other retail locations or even other POS positions within a same store.

During step 1050 the system performs an "elapsed time" test wherein the total time from issuance to redemption of an electronic coupon is compared to a statistically improbable time period to identify potentially fraudulent activity. If the elapsed time is less than the statistically improbable time period, then the transaction is flagged as (potentially) fraudulent. In a particular example, the elapsed time for a particular transaction is compared to a mean time for similar redemptions (e.g., a same product, a same store, a same class of products, etc.). If the elapsed time differs by a statistically significant amount (e.g., multiple standard deviations) from the mean time of similar redemptions, then the redemption transaction is flagged as suspicious/fraudulent. For example, if the issuance/redemption transaction series time span was too short, (e.g., 5 minutes when the next closest time period is a half hour), then the issuance/redemption transaction series is identified as suspicious (likely fraudulent). FIG. 14 depicts an exemplary Ad Campaign management user interface providing, among other things, a set of Ad Campaign statistics (e.g., mean, median, and mode) to which issuance-to-redemption times of particular instances are compared.

During step 1060 the system performs a statistical test on a retailer's total redemptions (over a period of time) test. The number of redemption is identified as abnormal in a variety of ways. For example, if a Retailer has an abnormally high number of redemptions over a period of time (compared to the Mean of all other Retailers), then automated fraud detection processes flag the retailer for potential fraud. A high number of redemptions is determined, in a particular example, by the percentage of sales for which a coupon was used. FIG. 15 depicts an exemplary Ad Campaign management user interface providing, among other things, a set of Ad Campaign statistics identifying percentage of total issued coupons and percentage of total redeemed coupons.

During step 1070 the system performs a statistical test to detect instances where a particular Consumer has an abnormally high number of redemptions over a period of time (compared to the Mean of all other Consumers). The system automatically detects and then flags abnormally high coupon redemptions attributed to a Consumer. To counter a user creating multiple consumer accounts to reduce the apparent number of redemptions under a single user, a group of Consumers is potentially aggregated based upon a same mail/email address provided by different Consumers.

Figure 16:
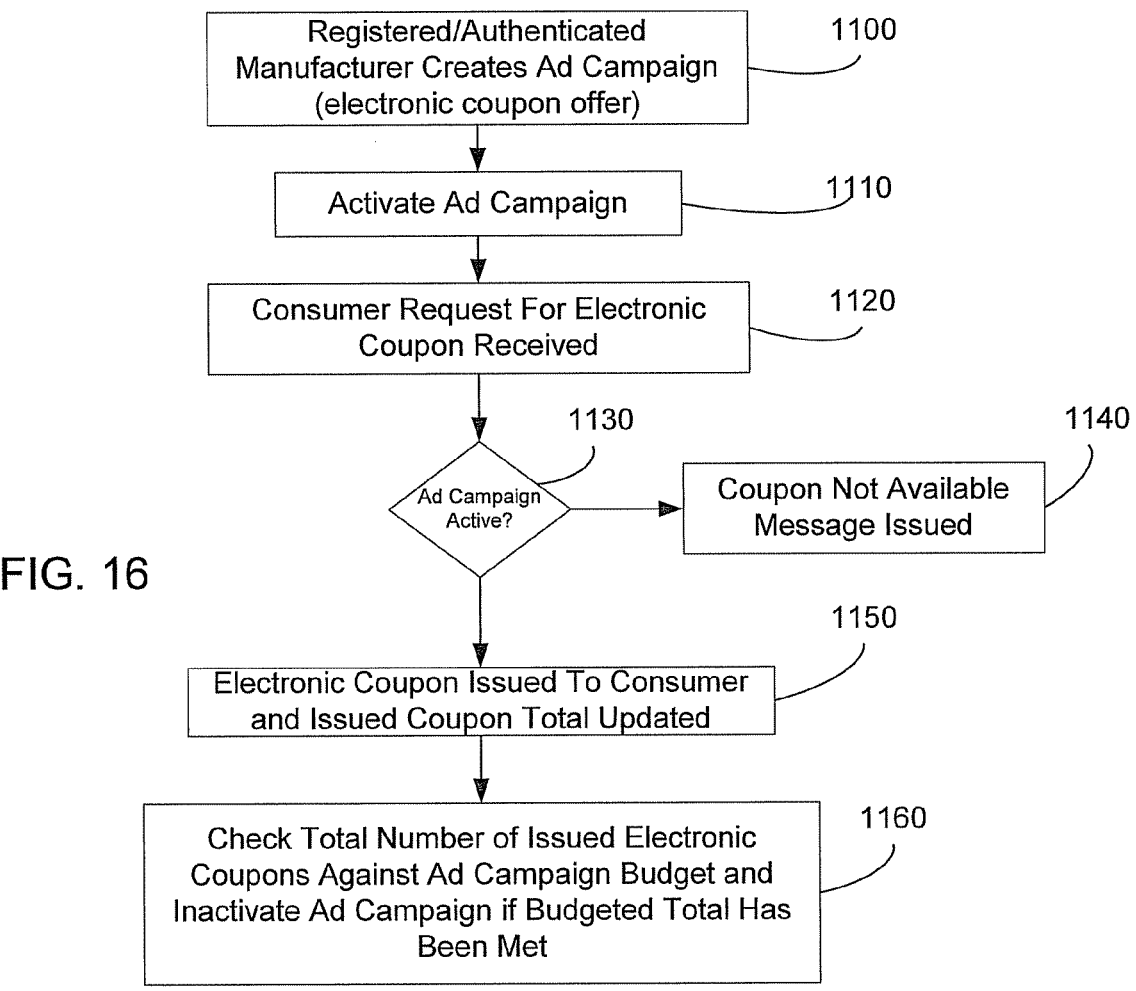
FIG. 16 is a flowchart summarizing a set of steps for managing Ad Campaign budgets.
Figure 17:
FIG. 17 is an exemplary user interface for editing an Ad Campaign.

Real Time Automatic Campaign Budget Management:

Another added functionality facilitated by the electronic coupon management infrastructure described herein above involves real time management of an Ad Campaign. Referring to FIG. 16, during step 1100 an Ad Campaign is created. As explained herein above with reference to FIG. 4s, the Ad Campaign table record 470 supports designating an Ad Campaign budget and an assumed redemption value for the electronic coupon. The budget for an ad campaign is entered as a dollar amount into the system or, alternatively, a number that will limit the total number of coupons issued. FIG. 17 depicts an exemplary Ad Campaign editor interface allowing the fields of the Ad Campaign to be entered—including the number of coupons (e.g., 1630) or total value redeemed (e.g., $3,000).

Thereafter, during step 1110 the defined Ad Campaign is activated thereby making the electronic coupon offer available for issuance to Consumers.

During step 1120 an electronic coupon is requested by a Consumer. In response, during step 1130, a responsible one of the consumer servers 110a checks the forced_web_inactive field (see, FIG. 4s) of the Ad Campaign record for the requested electronic coupon to determine whether the corresponding Ad Campaign is active or inactive (by reference to a forced_web_inactive field). If the Ad Campaign is inactive, then control passes to step 1140 wherein the responsive consumer server returns a message to the Consumer indicating that the coupon is no longer available. If, however, the Ad Campaign is active Web Active, then control passes to step 1150 wherein the consumer server issues, to the requesting Consumer, an electronic coupon corresponding to the Ad Campaign. Also, during step 1150 the consumer server updates (in real time) the total number of issued electronic coupons and the collective value of the issued electronic coupons for the Ad Campaign.

After updating the total number and cumulative value of issued coupons, control passes to step 1160. During step 1160, if the number of outstanding coupons is equal to, or greater than, the Ad Campaign's budget, then the Ad Campaign status is set to inactive via the forced_web_inactive field of the Ad Campaign record. This prevents further presentation of the Ad Campaign via an Offers page on the Consumers applications 100.

It is also noted that at any time after the ad campaign is created, the total number and cumulative value of issued electronic coupons is available immediately to the Manufacture via, for example, an ad campaign interface (see, FIG. 14—campaign budget information) supported by the manufacturer servers 110b. The Ad campaign interface provides budget information for the Ad Campaign including, among other things, the number of currently issued electronic coupons (and their cumulative value) under the particular Ad Campaign.

Figure 18:
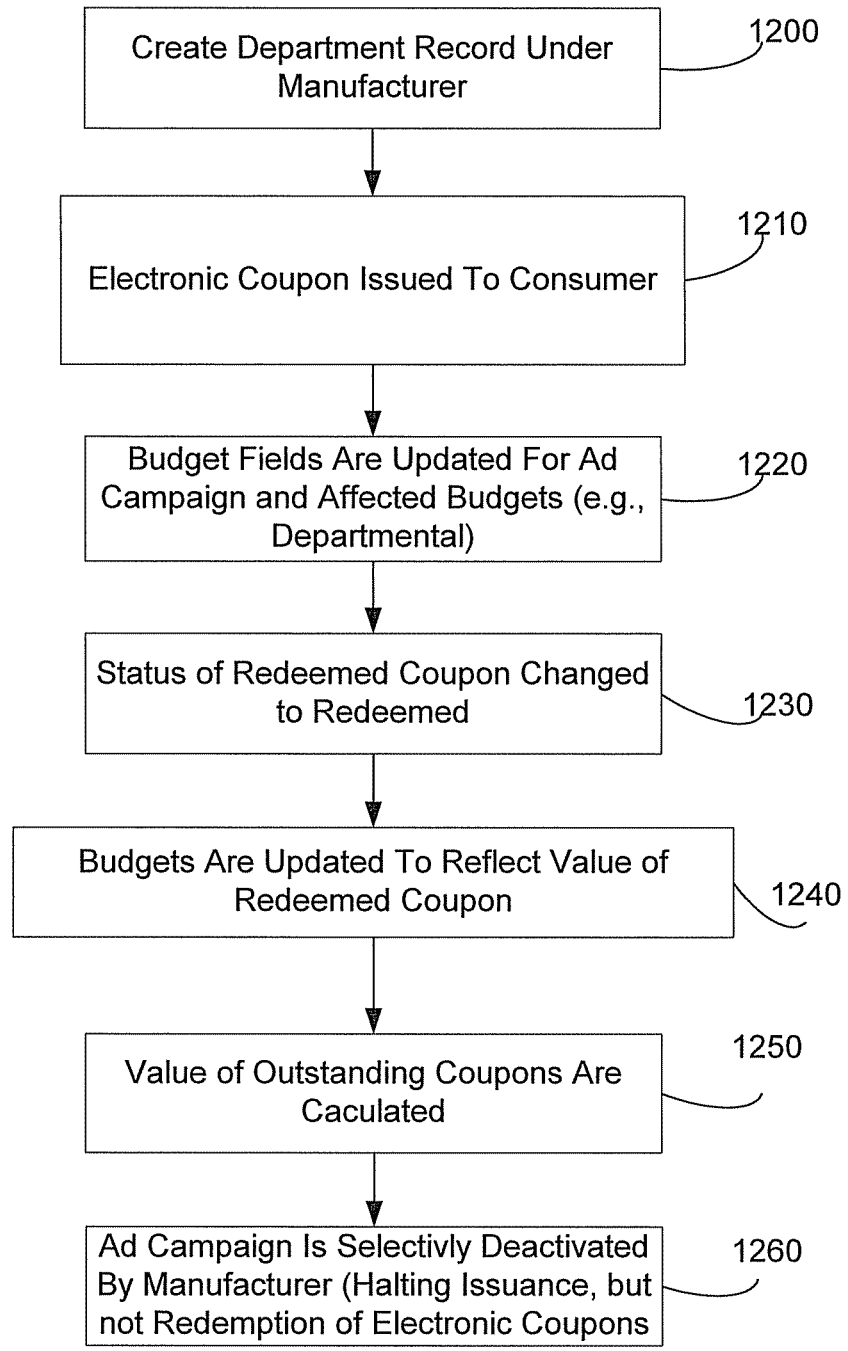
FIG. 18 is a flowchart summarizing a set of steps for monitoring and controlling budgets in near-real time.

Near Real Time Departmental Budget Monitoring and Control:

Another functionality supported by the system described herein relates to monitoring and control of budgets on a near real-time basis. Turning to FIG. 18, during step 1200 a department record is created under a particular manufacture account (Manufacturer). Thereafter, an ad campaign budget is designated for the department. An example of an ad campaigns summary user interface for the Manufacturers applications 102 is presented in the screen shot provided in FIG. 19. Furthermore, the system supports designating one or more sub-departments within a department wherein each sub-department is assigned a budget. The department and sub-department budgets are used to calculate a Manufacturer's total budget. The Manufacturer's total budget is calculated by the system (e.g., the Manufacture servers 110b) by adding all of the departments and sub-departments together.

Thereafter, during step 1210, in response to a user request, assuming the ad campaign is active, the requested electronic coupon is issued to a Consumer.

During step 1220 the responsive one of the manufacturer servers 110b updates all the budget fields associated with the issued electronic coupon. Thus, in addition to updating the ad campaign related information (described herein above with reference to real time ad campaign budget management procedures), the accumulated value of issued coupons for a department of the Manufacturer with which the issued coupon is associated is updated based upon the value of the coupon and any fees associated with the coupon. With reference to FIG. 19, the budget, number of coupons issued, and the percent of budget for issued coupons is calculated and displayed, for the department (or sub-department).

During step 1230, in response to redemption, via one of the retailer POS applications 106, of the electronic coupon issued during step 1210, the previously issued electronic coupon's status is changed to "redeemed".

During step 1240, the redemption value of the coupon plus any fees associated with the coupon are calculated (in real time) and added to the value of coupons "redeemed" in the redeemed electronic coupon's designated department (or sub-department) for the identified Manufacturer. The budget, number of coupons used, and the percent of budget for used coupons is calculated and displayed, for the identified department (see, e.g., FIG. 19, "All Ad Campaigns Summary") and/or sub-department.

During step 1250, the value of "outstanding" (issued, unexpired but not yet redeemed by a Retailer POS Register) coupons are calculated. Expired electronic coupons are periodically identified and processed to render the "outstanding" value for an electronic coupon. The value of outstanding coupons is applied to the Manufacturer's department budget and/or the Manufacturer's total budget to render "percent of budget" calculations for each department. The calculated percentages are displayed to a user via the Manufacture applications 102 (see FIG. 19, "All Ad Campaigns Summary"). Due to the periodic processing of expired electronic coupons, the "outstanding" value is considered to be "near real time."

During step 1260, an ad campaign is selectively deactivated via the Manufacturer applications 102 to halt issuance (but not redemption) of previously issued electronic coupons. In the exemplary embodiment, a user deactivates a particular ad campaign via the "actions" column of the All Ad Campaigns user interface (see, FIG. 19, "Actions" column and "Deactivate" link). This action has the effect of setting the corresponding Ad Campaign "inactive" (see, FIG. 4r, forced_web_inactive) to prevent/limit departmental budget overruns by preventing further issuance of electronic coupons under the Ad Campaign.

Controlling Liability Associated with Ad Campaign (Definition) Errors:

In addition to enhanced control over budgets, the disclosed electronic coupon infrastructure facilitates controlling liability arising from coupon definition errors through nearly instantaneous access/control over the active/inactive status of a previously defined Ad Campaign via the aforementioned "Deactivate" link on the Ad Campaign user interface depicted in FIG. 19. Setting the status of an Ad Campaign to "inactive" immediately stops the issuance of additional electronic coupons associated with the inactivated Ad Campaign.

Figure 20:
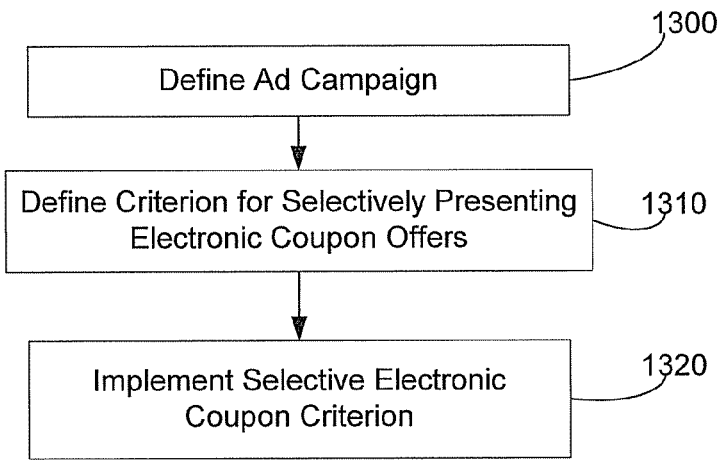
FIG. 20 is a flowchart summarizing a set of steps associated with carrying out a focused Ad Campaign.

Manufacturer and Retailer Deposit Coupons to Drive Purchase Behavior:

Turning to FIG. 20, yet another functionality supported by the system infrastructure described herein is the ability to define and execute focused marketing campaigns based upon Consumer demographics and previous and/or current coupon selection activities and coupon redemption activities. During step 1300, an ad campaign (electronic coupon template) is defined (see, FIG. 4r). During step 1310, rather than publish an offer generally available to all Consumers, a selective distribution criterion is defined based upon user profile information (e.g., distribution is limited to a specified ZIP code). Thereafter, during step 1320 the selective distribution criterion is implemented. In a first embodiment, an electronic coupon is automatically added to each consumer account meeting the criterion. In other embodiments, the limitation is used to define the coupon offers displayed for particular Consumers via the Consumer applications 100. Another embodiment incorporates additional/supplemental marketing activities within the Consumers account based on actions taken with a selected but not redeemed coupon such as offering to increase the value of a specific coupon if the Consumer watches an advertisement for the product featured in the specific coupon. In yet another embodiment, an email message describing the electronic coupon offer (product, value, etc.) is sent to specified email addresses corresponding to Consumers that meet the qualifying criterion. The email includes a link to a web page maintained by the consumer servers 110a for displaying the electronic coupon offer for acceptance by the notified parties. This proactive coupon distribution feature provides a marketing tool to actively induce consumers to evaluate or purchase the Manufacturer's products.

Calculate Brand Elasticity and Optimization By Region:

The system described herein also facilitates automated calculation of values indicative of the success of particular Ad Campaigns on a regionalized basis. An exemplary user interface for reporting such results is provided in FIG. 21. In addition to providing collective values and averages, values in the table can be further processed to render additional information. For example, a "take rate" (the percentage of electronic coupons issued as a percentage of total Consumers exposed to the offer for an ad campaign) or redemption rate (percentage of issued coupons that are redeemed) is calculated on a ZIP code basis. The regionalized statistical numbers are then compared to the Total number of Coupons Issued by the system for that Ad Campaign (See Screen Shot 1: Ad Campaign Budget Information—Issued). The calculation on a particular region is used by the Manufacturer to determine the highest percent of coupons requested and redeemed by a region (e.g., a particular ZIP code) for an Ad Campaign.

In a particular embodiment, regional take/redemption rates are analyzed, with respect to the face value of the coupons to determine if increasing the face value of the coupons significantly increases the take rate, or redemption rate of that coupon for the associated product. These statistics allow the Manufacturer to calculate the optimal face value per Ad Campaign, by region, in order to increase the redemption rate (sales of products) with the smallest discount rate (coupons face value) in order to maximize profits. For Example: a $0.50 coupon on a specific product might create the same amount of sales in a rural region (e.g., Bald Knob Ark.), as a $1.00 coupon on the same product would in a major metropolitan area (like New York, N.Y.). Differentiating between offers according to past redemption statistics potentially increases net profit because the discount provided by the coupons can be substantially lower in particular regions. In addition to region, the system provides the ability for to optimize coupon usage based on a variety of differentiating factors exposed through statistical analysis of past Ad Campaign results including: time to redeem and profitability.

Real Time Incentive Distribution Measurement and Channel Effectiveness:

The system disclosed herein supports presentation of electronic coupon offers via a variety of distribution channels. In addition to a general Web site dedicated to presentation of electronic coupon offers, embodiments of the present invention support focused offers embedded on virtually any Web page/site. Therefore, yet another value-added functionality supported by the disclosed electronic coupon system relates to the determination, in real time, of channel effectiveness. In accordance with an illustrative example, the system receives an identifier for a site/Web page from which a Consumer has requested an electronic coupon—also referred to as a coupon distribution channel. The location is maintained in a location_id field of the issued electronic coupon record for a Consumer. The distribution channel information is calculated along with the number of Coupons issued, number of Coupons Redeemed, Zip Code for Consumer, Location where the coupons was redeemed (Retailer), and mean time for redemption. This real time analysis of the information collected allows a system manager, manufacturer, or retailer to:

- determine which distribution channel is more effective based on the total number of coupons Requested/Issued
- determine which distribution channel is more effective (best rate on return) based on the total number of Coupons Redeemed
- determine which distribution channel is more effective based on the total number of coupons Requested/Issued for a Region (Consumer's Zip Code)
- determine which distribution channel is more effective based on the total number of Coupons Redeemed by Region (Consumer's Zip Code)
- determine which distribution channel is more effective for a Retailer, based on the total number of Coupons Redeemed by the Retailer
- determine which distribution channel is the most effective (fastest) at turning products by tracking the mean time of redemption.

An important facilitator of each of the above determinations is the identification of a channel through which each electronic coupon issues.

The structures, techniques, and benefits discussed above are merely exemplary embodiments of the invention. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Moreover, those of skill in the art will recognize that the disclosed principles are not limited to any particular local area network protocols and/or topologies. Therefore, the invention as described herein contemplates all such embodiments as may come within the scope of the following claims and equivalents thereof.

What is claimed is:

1. A subscriber-based system, carried out by a set of programmed computers, for enabling electronic promotional transactions over a variety of networks in real time, the subscriber-based system comprising:
    a database system for maintaining and providing access to information related to the subscriber-based system;
    an application server system comprising a set of processing modules, including computer-executable instructions stored on a physical computer-readable medium and executed on one or more computers, supporting electronic promotional transactions, the set of processing modules including:
        an electronic manufacturer account module for creating a manufacturer account and for enabling a manufacturer to create, access and manage information in the manufacturer account, and including an electronic record template for specifying a set of parameter values for defining and managing an electronic promotion,
        an electronic consumer account module for creating a consumer account and for enabling a consumer to thereafter access and manage information in the consumer account,
        an electronic retailer account module for creating a retailer account and for enabling a retailer to thereafter access and manage information in the retailer account,
        an electronic coupon generation module for generating an electronic coupon according to parameter values specified for the electronic promotion, and
        a point of sale module supporting consumer access to the subscriber-based system via a retailer point of sale device;
    whereby:
        the consumer, associated with a consumer account, initiates a transaction with the subscriber-based system related to the electronic promotion,
        the electronic coupon generation module identifies the consumer account associated with the consumer using identification criteria stored in the database system; and,
        the coupon generation module creates the electronic coupon having a unique electronic coupon identifier and further assigns the unique electronic coupon ID to the consumer account creating a data link between the consumer account and electronic coupon generated in association with the electronic promotion,
        the consumer initiates a retail transaction via the point of sale device, and
        the point of sale module transmits information from the point of sale device enabling the subscriber-based system to identify the consumer account, thus enabling the point of sale module to receive data stored in the database system corresponding to the consumer account and the electronic coupon generated in association with the electronic promotion to facilitate validation and redemption of the electronic coupon at the point of sale device.

2. The subscriber-based system in claim 1 further comprising an activation mechanism enabling the consumer to initiate the transaction with the subscriber-based system, the activation mechanism enabling identification of the consumer account to the subscriber-based system and further enabling presentation and creation of the electronic coupon to the consumer by the coupon generation module.

3. The subscriber-based system in claim 2, the activation mechanism being a hypertext link presented to the consumer in graphical fashion in an electronic media which enables the consumer to selectively activate the hypertext link and thereby generate the electronic coupon.

4. The subscriber-based system in claim 2, the activation mechanism being embedded button presented to the consumer in an electronic medium.

5. The subscriber-based system in claim 2, the activation mechanism being a banner ad presented to the consumer in an electronic medium.

6. The subscriber-based system in claim 2, the activation mechanism being a graphical representation of the electronic coupon presented to the consumer in an electronic medium.

7. The subscriber-based system in claim 1, the consumer initiating a redemption event with the retailer using a redemption mechanism previously registered with said subscriber-based system which enables identification of the consumer to the subscriber-based system and further enables validation of the electronic coupon by the subscriber-based system and thereafter redemption of the electronic coupon by the consumer and the retailer.

8. The subscriber-based system in claim 7, the redemption mechanism being a retailer-issued frequent shopper card that has been registered with the subscriber-based system.

9. The subscriber-based system in claim 7, the redemption mechanism being a unique identification code registered with the subscriber-based system and subsequently supplied by the consumer to the retailer.

10. The subscriber-based system in claim 1, the application server system including computer-executable instructions stored on a computer-readable medium for assigning:
a first unique electronic ID to the manufacture account,
a second unique electronic ID to the consumer account,
a third unique electronic ID to the retailer account, and
a fourth unique electronic ID to the point of sale device; and
the subscriber-based system including computer-executable instructions stored on a computer-readable medium for correlating each unique electronic ID with the unique electronic coupon identifier.

11. The subscriber-based system in claim 10, the subscriber-based system including computer-executable instructions for correlating the electronic IDs and coupon identifier and utilizing data stored in records associated with an electronic promotional transaction to analyze transaction details and compare the transaction details with a set of predetermined criteria indicative of fraudulent activity related to the electronic promotional transaction.

12. The subscriber-based system in claim 11, the records including values indicating a specific electronic promotion, the unique consumer ID, the unique electronic coupon ID, UPC values associated with the electronic promotion, the retailer ID and the POS ID, and such values constituting a valid combination.

13. The subscriber-based system in claim 10, the subscriber-based system including a computer-readable medium including computer-executable instructions for correlating the electronic IDs and coupon identifier and utilizing data stored in records associated with an electronic promotional transaction to analyze transaction details and compare the transaction details with a set of predetermined criteria indicative of selected market characteristics related to the electronic promotional transaction.

14. The subscriber-based system in claim 13, the records including a value indicating an identifier for a site/Web page from which a consumer requested the electronic coupon via a consumer account.

15. The subscriber-based system in claim 13, the records including a value indicating the zip code in which a Consumer redeems the electronic coupon.

16. The subscriber-based system in claim 13, the records including values correlating to redemption rates for the electronic coupon, and the subscriber-based system utilizing the values to determine the smallest effective discount rate for the electronic coupon.

17. The subscriber-based system in claim 13, the records including values facilitating automatic adjustment of the value of the electronic coupon associated with the consumer account such that a consumer associated with the consumer account is further induced to redeem the electronic coupon.

18. The subscriber-based system in claim 10, the subscriber-based system correlating the electronic IDs and coupon identifier and utilizing data stored in records associated with an electronic promotional transaction including UPC information associated with specific products within the electronic promotion, the subscriber-based system supporting complex promotions.

19. The subscriber-based system in claim 10, the records being updated with UPC information associated with redemptions through the consumer account and enabling the subscriber-based system to support loyalty promotions.

20. The subscriber-based system in claim 10, the records being updated with UPC information associated with redemptions through the consumer account and enabling the subscriber-based system to support cross-product promotions.

21. The subscriber-based system in claim 1, the electronic template enabling input, through the manufacturer account, of various values associated with the electronic promotion, and updating records stored in the database with information transmitted by each POS registered with the subscriber-based system such that a manufacturer associated with the manufacturer account can analyze and manage the electronic promotion.

22. The subscriber-based system in claim 21, one of the various values being a maximum financial exposure value, designated via the manufacturer account for the electronic promotion, and the subscriber-based system utilizing the updated information from the POSs to automatically terminate the electronic promotion when the maximum financial exposure value is reached.

23. The subscriber-based system in claim 1, the records stored in the database system being updated with information associated with each electronic coupon by each POS coupled to the subscriber-based system whereby each electronic coupon can be reconciled by a retailer identification and a manufacturer identification.

24. The subscriber-based system in claim 23, the records including fields indicating a redemption value of each electronic coupon, a manufacturer account associated with issuance of an electronic coupon, a retailer account associated with redemption of the electronic coupon and a redemption amount due to the retailer account from the manufacturer account, the subscriber-based system generating an invoice from the retailer account to the manufacturer account and providing for payment of the invoice by the manufacturer account.

* * * * *